United States Patent
Ohara et al.

(10) Patent No.: US 6,434,270 B1
(45) Date of Patent: *Aug. 13, 2002

(54) PATTERN EXTRACTION APPARATUS

(75) Inventors: Atsuko Ohara; Satoshi Naoi, both of Kawasaki (JP)

(73) Assignee: Fujitsu Limited, Kawasaki (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/021,540

(22) Filed: Feb. 10, 1998

(30) Foreign Application Priority Data

May 30, 1997 (JP) .............................. 9-141470

(51) Int. Cl.⁷ ................................. G06K 9/34
(52) U.S. Cl. ........................ 382/178; 382/178; 382/185; 382/194; 382/202
(58) Field of Search ................ 382/178, 185, 382/196, 197, 200, 203, 204, 209, 217, 173, 177, 192–194, 202

(56) References Cited

U.S. PATENT DOCUMENTS

| | | | | |
|---|---|---|---|---|
| 4,468,808 A | * | 8/1984 | Mori et al. ................ | 382/196 |
| 4,566,124 A | * | 1/1986 | Yamamoto et al. .......... | 382/185 |
| 4,654,873 A | * | 3/1987 | Fujisawa et al. ............ | 382/178 |
| 4,833,721 A | * | 5/1989 | Okutomi et al. ............ | 382/197 |
| 5,109,431 A | * | 4/1992 | Nishiya et al. ............. | 382/209 |
| 5,386,508 A | * | 1/1995 | Itonori et al. .............. | 717/1 |
| 5,590,220 A | * | 12/1996 | Takahashi ................... | 382/203 |
| 5,708,730 A | * | 1/1998 | Itonori ........................ | 382/177 |
| 5,848,008 A | * | 12/1998 | Katoh et al. ................. | 382/217 |
| 5,889,887 A | * | 3/1999 | Yabuki et al. ............... | 382/178 |
| 5,896,464 A | * | 4/1999 | Horiuchi et al. ............. | 382/178 |
| 5,898,795 A | * | 4/1999 | Bessho ........................ | 382/173 |
| 6,005,976 A | * | 12/1999 | Naoi et al. ................... | 382/202 |
| 6,035,059 A | * | 3/2000 | Kurosawa et al. .......... | 382/164 |

FOREIGN PATENT DOCUMENTS

| | | | |
|---|---|---|---|
| JP | 6-309498 | 11/1994 | ............... 382/9 |
| JP | 7-28937 | 1/1995 | ............... 382/9 |
| JP | 7-220194 | 8/1995 | |
| JP | 09138837 A | 11/1995 | |
| JP | 7-325921 | 12/1995 | |
| JP | 8-55219 | 2/1996 | |
| JP | 8-87914 | 4/1996 | |

OTHER PUBLICATIONS

Korean Office Action, May 25, 2000, with translation.
U.S. application No. 08/342,185, Katsuyama, filed Dec. 20, 1996, Assignee is Fujitsu Limited.
Japanese Office Action, May 25, 2000, with translation.
U.S. patent application Ser. No. 08/342,185, Katsuyama, filed Dec. 20, 1996.

* cited by examiner

Primary Examiner—Jose L. Couso
Assistant Examiner—Gregory Desire
(74) Attorney, Agent, or Firm—Staas & Halsey LLP

(57) ABSTRACT

A pattern extraction apparatus computes the convexity/concavity of an input pattern, regards a pattern having large convexity/concavity as a character, and regards a pattern having small convexity/concavity as a ruled line.

29 Claims, 40 Drawing Sheets

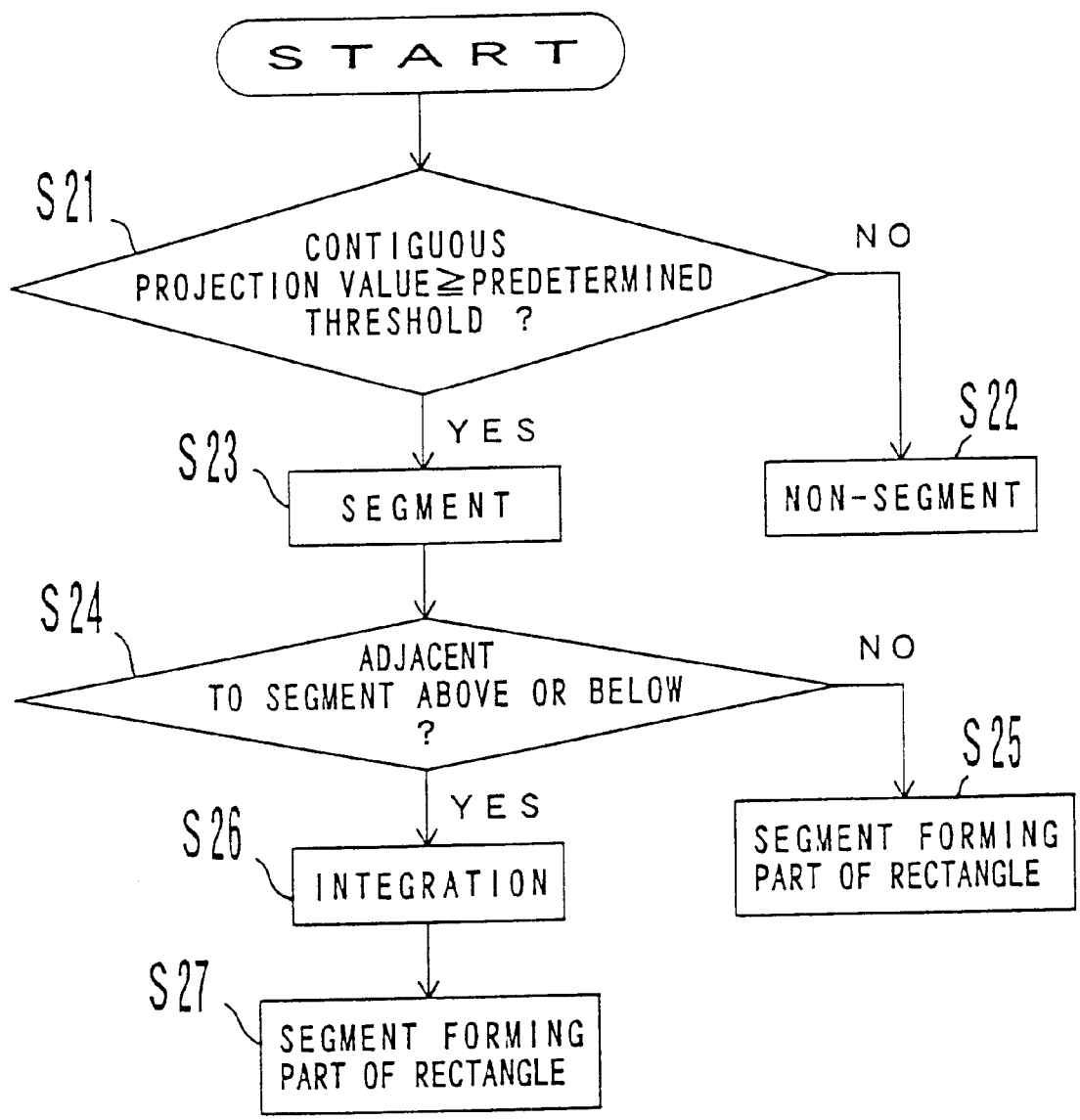
F I G. 1 3

FIG. 23

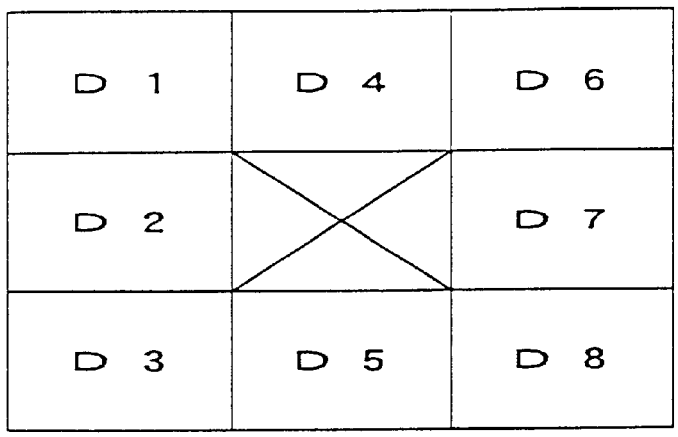
SEARCH DIRECTION RIGHT OR LEFT
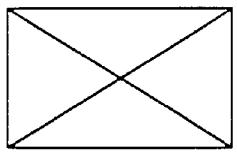 TARGET PIXEL
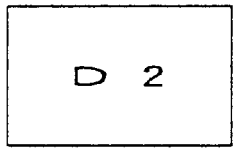 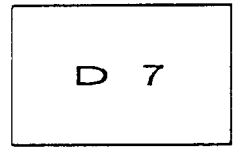 PIXEL ADJACENT TO TARGET PIXEL IN SEARCH DIRECTION
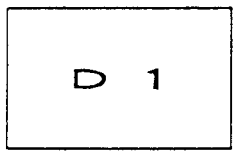 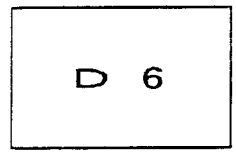 PIXEL DIAGONALLY ABOVE TARGET PIXEL IN SEARCH DIRECTION
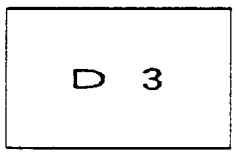 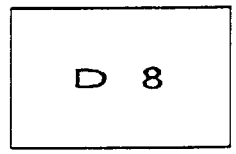 PIXEL DIAGONALLY BELOW TARGET PIXEL IN SEARCH DIRECTION
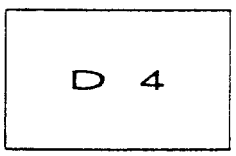 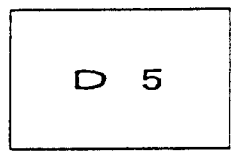 PIXEL ADJACENT ABOVE OR BELOW TARGET PIXEL
F I G. 2 7

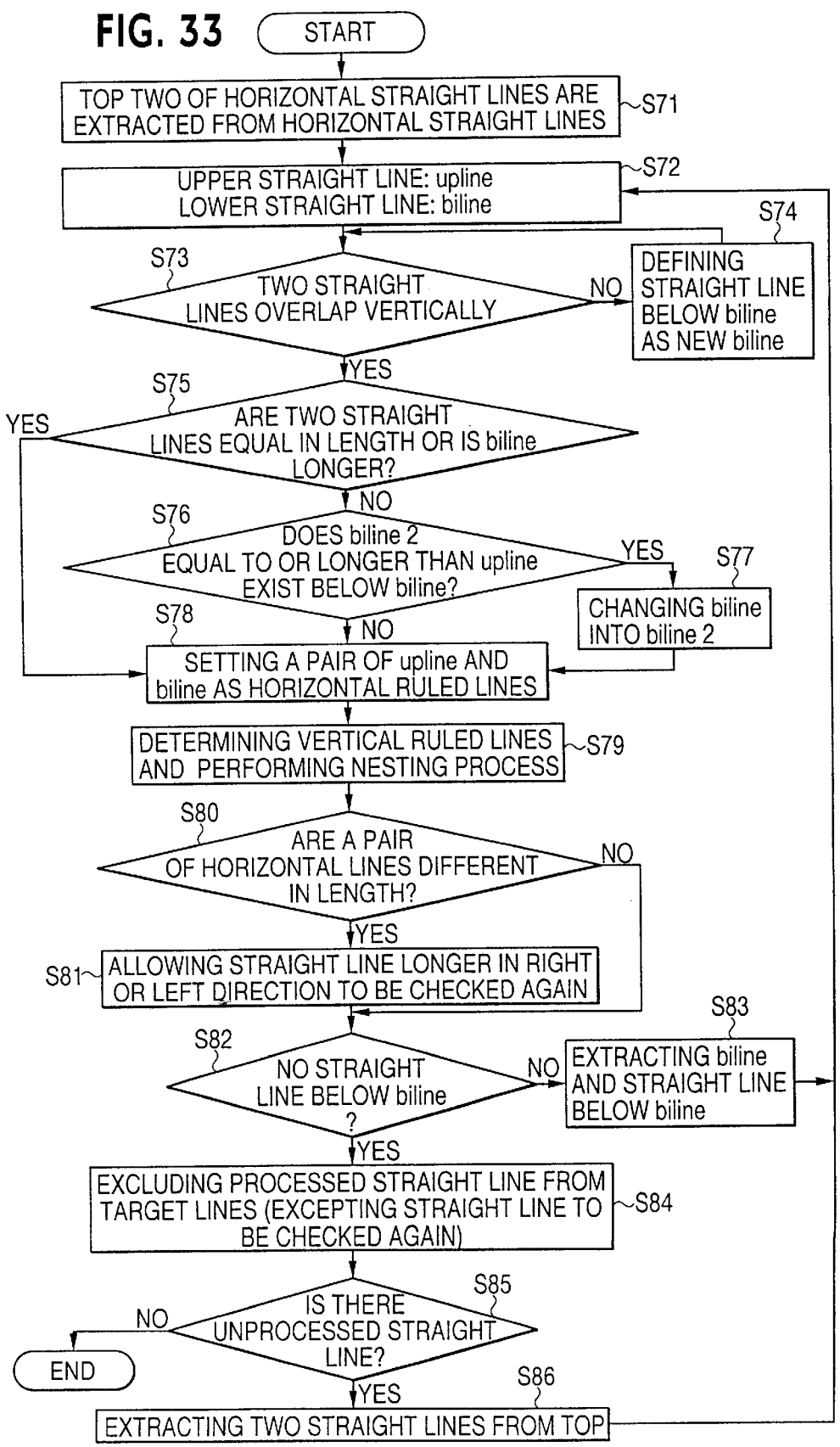

PATTERN EXTRACTION APPARATUS

BACKGROUND OF THE INVENTION

1. Field of the Invention

The present invention relates to a pattern extraction apparatus and a pattern extracting method, and is specifically applicable to a case where a box and a ruled line indicating the range of a pattern containing characters, graphics, symbols, images, etc. in a hand-written character recognition apparatus, a printed character recognition apparatus, a graphics recognition apparatus, etc.

2. Prior Art Technology

Recently, there has been an increasing demand for a hand-written character recognition apparatus such as an optical character reader as a peripheral unit for inputting financial documents, business documents, etc.

A conventional optical character reader performs a character segmenting process on each character of a character pattern from an input image before recognizing a character. To attain a high character recognition rate for each character, an optical character reader has to correctly segment a character as a pre-recognition process.

Therefore, when a conventional optical character reader reads a character, a character is written in a specified range in a document such as a listing in which a character input position is specified (not with drop-out color but with, for example, a black rectangular box or a ruled line with similar color or density as a character) to attain a high recognition rate.

However, the conventional optical character reader has the problem that the character recognition rate is low because a character cannot be correctly segmented when the ruled line or rectangular box indicating a specified input range touches or intersects the character. For example, a current optical character reader cannot recognize a slight obliqueness, concavity, or convexity of a rectangular box when the rectangular box is removed. As a result, if the position or the line width of a rectangular box is changed, a part of a character to be recognized may be lost or a part of the rectangular box may remain unremoved.

When a range of inputting characters in a listing is specified, the information about the position and the fineness of a ruled line should be preliminarily stored, and the information about the range of inputting characters should be updated if a listing format is changed. Therefore, the conventional system gives a user a heavy load. Furthermore, in a system of specifying a character range, an unknown listing format cannot be processed.

In the previous Japanese patent application (Tokuganhei) No. 7-203259, the Applicant suggested the technology of extracting and removing a rectangular box without inputting format information about the position or size of a rectangular box. Applicable listings in this technology are a one-rectangular box, a block rectangular box (containing a single horizontal row of characters, or a free-format rectangular box), or a table having rectangular box with horizontal lines regularly arranged. Furthermore, the technology can process listings having no rectangular tables, having further complicated table structures, or listings in which dotted lines and solid lines coexist.

Described below is the outline of the process performed by the pattern extraction apparatus described in the specification and the attached drawings of the previous Japanese patent application (Tokuganhei) No. 7-203259.

First, an input image is labelled, and a portion pattern which is formed from pixels linked to each other in any of eight directions, that is, horizontally, vertically and diagonally, can be extracted as a linked pattern.

Then, the horizontal or vertical lines are fined to reduce the difference in fineness of lines between a character and a rectangular box by performing a masking process on a linked pattern extracted by labelling an input image. In the masking process, the entire image of the linked pattern is scanned using two types of masks, that is, a horizontal mask and a vertical mask. The proportion of the pattern to the mask is computed. If the proportion is above a predetermined value, then the entire mask is recognized as a pattern. If it is equal to or below the predetermined value, then vertical and horizontal elements are extracted by deleting the pattern in the mask.

Then, the masked pattern is divided into a plurality of pieces vertically or horizontally, and a contiguous projection value of the pattern is computed in each of the ranges divided vertically and horizontally. Based on the contiguous projection pattern, a predetermined length of a line or a part of a straight line is detected by an approximate rectangle. A contiguous projection value is obtained by adding the projection value of a target row or a target column to the projection value of a row or a column close to the target row or the target column.

Next, among the lines each forming part of a rectangle obtained by the contiguous projection method, adjacent lines forming part of a rectangle are combined into a long line. Thus, the obtained lines form an approximate rectangle, and can be recognized as candidates for horizontal or vertical ruled lines of a listing.

Then, the horizontal or vertical lines recognized as candidates for ruled lines are searched to detect the left and right margins for the horizontal lines, and the upper and lower margins for the vertical lines.

Next, small patterns arranged at predetermined intervals are detected to extract dotted lines and obtain an approximate rectangle using the dotted lines as in the above described lines.

A set of two horizontal lines forming part of a rectangular box is determined from among the horizontal lines detected in the above described process. Two horizontal lines are sequentially extracted from the top. When the two extracted horizontal lines have the same length or the lower horizontal line is longer than the upper horizontal line, the two horizontal lines are recognized as a set of horizontal lines. Unless the two extracted horizontal lines have the same length or the lower horizontal line is longer than the upper horizontal line, the two lines are recognized as a set even if the lower line is shorter.

Then, from among the horizontal lines detected in the above described process, the vertical ruled lines are determined if both upper and lower ends of them reach the above described set of two horizontal lines recognized as a set of two horizontal ruled lines.

Then, the range of a rectangle encompassed by the above described set of two horizontal lines and the two vertical ruled lines both upper and lower ends of which reach the set of the two horizontal lines is extracted as a cell. A line forming part of the cell is recognized as a ruled line. A line not forming part of the cell is recognized as a pattern other than a ruled line.

When the rectangle encompassed by the horizontal and vertical ruled lines determined in the above described process is further divided into smaller rectangular areas, the rectangle is newly defined as a table. By repeating the above described process, the rectangular areas are divided into furthermore smaller rectangles.

Thus, according to the conventional technology, any table formed by rectangular areas can be processed regardless of a regular or an irregular structure of a rectangular box. The process can also be performed on solid lines and dotted lines as ruled lines to be processed.

However, the above described pattern extraction apparatus selects as a candidate for a ruled line an area having a high density of pixels. If characters are close to each other or touch each other, the density of the pixels becomes high around the characters, and the character area can be regarded as a candidate for a ruled line.

For example, in FIG. 1A, when a character string 201 文字 is entered in a listing 200, the density of the pixels of the pattern in a rectangular area 202 is high. Therefore, the pattern is recognized as a candidate for a ruled line although it is part of the character string 201. However, since the rectangular area 202 does not touch any of the ruled lines forming the listing 200, the rectangular area 202 cannot form a cell. Therefore, the pattern can be recognized that it is not a ruled line.

In FIG. 1B, when a character string 204 文字 is entered in a listing 203, the density of the pixels of the pattern in a rectangular area 205 is high. Therefore, the pattern is recognized as a candidate for a ruled line although it is part of the character string 204. The rectangular area 205 touches vertical ruled lines 207 and 208, and the rectangular area 205 can form a cell with the vertical ruled lines 207 and 208, and a horizontal ruled line 206. Therefore, a part of the character string 204 is regarded as a ruled line, and it is difficult to correctly segment the character string 204 文字, thereby causing the problem that a character cannot be correctly recognized.

SUMMARY OF THE INVENTION

The present invention aims at providing a pattern extraction apparatus for correctly determining whether or not a pattern is a ruled line.

The pattern extraction apparatus according to the present invention includes a pattern input unit; a convexity/concavity computation unit; a pattern distinction unit; a shift frequency calculation unit; a first search unit; a second search unit; a count unit; a obliqueness detection unit; a computation unit; an adjustment unit; a regulation unit; an intersection number count unit; a ruled line distinction unit; a character distinction unit; a linked pattern extraction unit; a ruled line candidate extraction unit; a search unit; a mask process unit; a cell area extraction unit; a ruled line removal unit; a segment detection unit; a straight line detection unit; a length computation unit; a length comparison unit; a convexity/concavity obtaining unit; a ruled line exclusion unit; a listing distinction unit; and a partial convexity/concavity computation unit.

According to the first aspect of the present invention, the pattern input unit inputs a pattern. The convexity/concavity computation unit computes the convexity and concavity of the above described pattern. The pattern distinction unit distinguishes the attribute of the above described pattern based on the convexity and concavity.

According to the second aspect of the present invention, the linked pattern extraction unit extracts a partial pattern formed by linked pixels from the input original image data. The ruled line candidate extraction unit extracts as a candidate for a ruled line a rectangular area having a high density of pixels from the above described partial pattern. The search unit searches the above described partial pattern in the rectangular area. The convexity/concavity computation unit computes the convexity/concavity of the above described partial pattern based on the search result of the above described search unit. The ruled line distinction unit distinguishes based on the above described convexity/concavity whether or not the above described partial pattern forms a ruled line.

BRIEF DESCRIPTION OF THE DRAWINGS

FIG. 13 is a flowchart showing a segment extracting method according to an embodiment of the present invention;

FIG. 23 shows the search direction for pixels according to an embodiment of the present invention;

FIG. 27 shows the relationship between the arrangement of the pixels according to an embodiment of the present invention;

FIG. 33 is a flowchart showing a horizontal ruled line determination process according to an embodiment of the present invention;

DESCRIPTION OF THE PREFERRED EMBODIMENTS

Figure 1A:
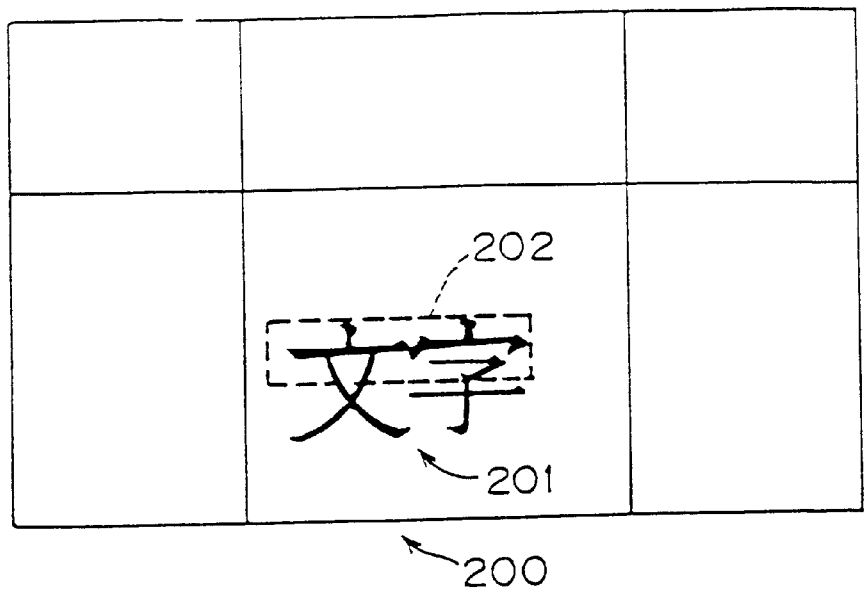
FIGS. 1A and 1B show the state of a character entered in a listing.
Figure 1B:
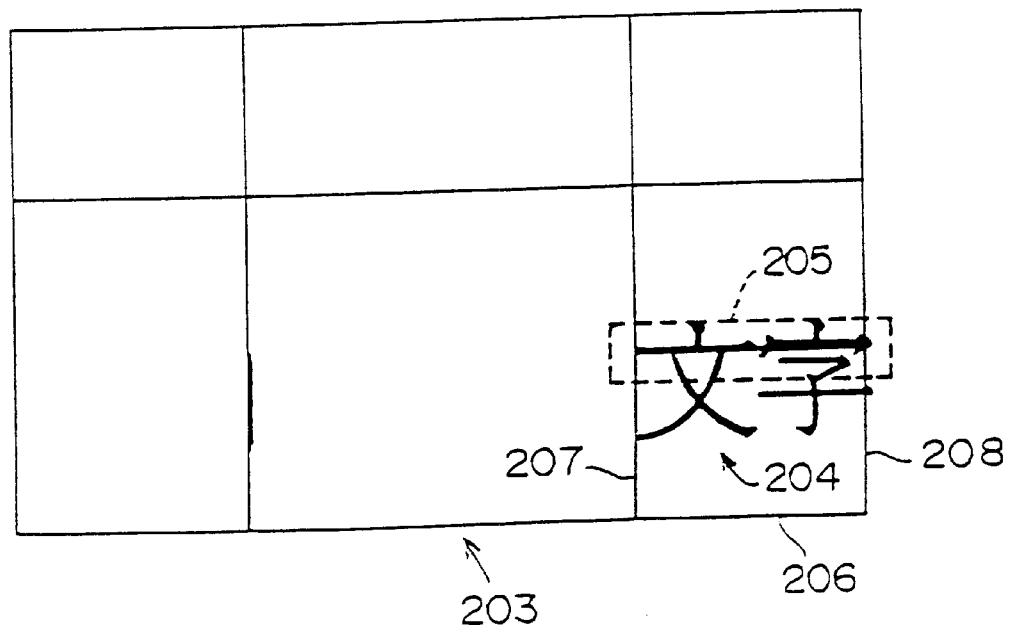

The embodiments of the present invention are described below in detail by referring to the attached drawings of the present invention.

To solve the above described problems, the present invention includes a pattern input unit for inputting a pattern; a convexity/concavity computation unit for computing the convexity/concavity of the pattern; and a pattern distinction unit for distinguishing the attribute of the pattern.

With the above described configuration, a pattern having small convexity/concavity such as a ruled line, a straight line, etc. can be distinguished from a pattern having large convexity/concavity such as a character, a symbol, etc., and the possibility that a ruled line, a straight line, etc. are mistakenly recognized as a character, a symbol, etc. can be reduced, thereby improving the pattern distinction precision.

According to an aspect of the present invention, convexity/concavity is computed based on the frequency of shifts in a pattern search direction.

Thus, the convexity/concavity of a pattern can be correctly computed, and a pattern having small convexity/concavity can be correctly distinguished from a pattern having large convexity/concavity.

According to another aspect of the present invention, pixels are searched in a predetermined direction, and they are searched in a direction different from the predetermined direction if there are no adjacent pixels in the predetermined direction. Thus, the pixels detected in the different direction are counted.

As a result, pixels are searched in the predetermined direction as long as adjacent pixels are found in the predetermined direction. Even if a ruled line, a straight line, etc. touch another pattern such as a character, a symbol, etc., the ruled line, straight line, etc. can be correctly detected. If no adjacent pixels can be found in the search direction according to the convexity/concavity of the pattern, the pixels search direction is changed and the frequency of shifts is counted, thereby checking the convexity/concavity of the pattern while searching the pattern.

According to a further aspect of the present invention, pixels are diagonally searched when there are no adjacent pixels in a predetermined direction.

Thus, the convexity/concavity of a pattern can be checked during the search for both ends of the pattern. Therefore, both ends of the pattern can be correctly detected by scanning the pattern only once, and the convexity/concavity of the pattern can be efficiently detected.

According to a further aspect of the present invention, the convexity/concavity of a pattern can be computed by obtaining the frequency of shifts in the search direction based on the obliqueness of the pattern.

Thus, the convexity/concavity of a pattern can be computed with high precision even when the pattern is oblique.

According to a further aspect of the present invention, when a pattern is separated by a space equal to or below a predetermined value, it is assumed in searching the pattern that the space is filled with pixels.

As a result, even if a pattern is separated as a broken pattern, the convexity/concavity of the pattern can be computed.

According to a further aspect of the present invention, the number of searches for pixels diagonally searched for is regulated by the length of the searched pattern.

Even when the size of a searched range is changed for each pattern, the change of the convexity/concavity of a pattern due to the difference in size of a searched range can be removed, and the convexity/concavity of the pattern can be computed based on the form of the pattern.

According to a further aspect of the present invention, the convexity/concavity of a pattern is computed based on the number of patterns intersecting in the search direction.

The number of intersections can be considered when the convexity/concavity of the pattern is computed, thereby correctly obtaining the convexity/concavity of the pattern.

According to a further aspect of the present invention, when the convexity/concavity of a pattern is equal to or below a threshold, it is determined that the pattern forms part of a ruled line.

Even when a part of a character is extracted and mistakenly recognized as a candidate for a ruled line, the part of the character can be prevented from being mistakenly recognized as a ruled line. Therefore, only a character to be recognized can be extracted with high precision from a listing containing characters, thereby improving the precision in character recognition.

According to a further aspect of the present invention, when the convexity/concavity of a pattern is equal to or above a threshold, it is determined that the pattern refers to a character.

Even when a part of a character is extracted and mistakenly recognized as a candidate for a ruled line, the part of the character can be prevented from being mistakenly recognized as a ruled line, thereby improving the precision in character recognition.

According to a further aspect of the present invention, when there is a pattern within a predetermined range of a pattern to be distinguished, a threshold for distinguishing the convexity/concavity of the pattern is changed.

When a part of the character is extracted as a candidate for a ruled line, the remaining pattern is adjacent to the candidate for a ruled line. Therefore, by setting a small threshold for the convexity/concavity of a pattern which is a candidate for a ruled line and is close to another pattern, it is distinguished with higher probability that the pattern which is a candidate for a ruled line is a character.

When a ruled line is correctly extracted as a candidate for a ruled line, another pattern such as a character is not close to the candidate for a ruled line. Therefore, by setting a large threshold for the convexity/concavity of a pattern which is a candidate for a ruled line and is not close to another pattern, the probability that the pattern which is a candidate for a ruled line is mistakenly recognized as a character can be reduced.

A further aspect of the present invention includes a linked pattern extraction unit for extracting a partial pattern formed by linked pixels from an input original image data; a ruled line candidate extraction unit for extracting as a candidate for a ruled line a rectangular area having high density of pixels from the partial pattern; a search unit for searching the partial pattern in the rectangular area; a convexity/concavity computation unit for computing the convexity/concavity of the partial pattern based on the search result of the search unit; and a ruled line distinction unit for distinguishing based on the convexity/concavity whether or not the partial pattern forms part of a ruled line.

Even if a character is extracted as a candidate for a ruled line because the density of the pixels of the character is high with another character written close to the character or with the character written unclearly, the character can be distinguished from a ruled line based on the convexity/concavity because a character has larger convexity/concavity than a ruled line. Therefore, the character can be prevented from being mistakenly recognized as a ruled line.

According to a further aspect of the present invention, convexity/concavity can be computed for each of the predetermined areas obtained by dividing a partial pattern.

Even when an area containing a ruled line and a character is extracted as a candidate for a ruled line, the convexity/concavity of the ruled line and the character can be separately computed, thereby preventing the ruled line and the character from being collectively processed as a partial pattern. As a result, it is avoided that a ruled line is mistakenly recognized as a character with the convexity/concavity of the ruled line affected by the convexity/concavity of the character, or a character is mistakenly recognized as a ruled line with the convexity/concavity of the character affected by the convexity/concavity of the ruled line.

A further aspect of the present invention includes a mask process unit for scanning the above described partial pattern using a predetermined size of a mask, regarding all the pixels in the mask as the above described partial pattern if the proportion of the partial pattern to the mask is equal to or above a predetermined value, and regarding the above described mask does not contain the above described partial pattern if the proportion of the partial pattern to the mask is below a predetermined value.

When a mask has longer sides in a predetermined direction, the pixels along the longer sides of the mask have a larger proportion to the mask while the pixels arranged in the direction different from the longer sides of the mask have a smaller ratio. Therefore, extremely oblique elements in the original image can be removed, thereby easily extracting a candidate for a ruled line.

According to a further aspect of the present invention, a rectangular area encompassed by four candidates for ruled lines is extracted as a cell, and a candidate for a ruled line which does not form part of a cell is removed from ruled lines.

As a result, for example, when a character is underlined, the underline does not form part of a cell and therefore can be removed from ruled lines even if it is extracted as a candidate for a ruled line, thereby improving the reliability in ruled line extraction.

According to a further aspect of the present invention, a convexity/concavity computation unit computes convexity/concavity by dividing a candidate for a ruled line in cell units.

Thus, the convexity/concavity of the sides forming each cell can be independently obtained. Therefore, even when a ruled line touches a character in an irregular listing and a part of the character is extracted as a candidate for a ruled line, the convexity/concavity can be computed for only the character and the precision in the ruled line extraction process can be improved even if the listing has an irregular form.

According to a further aspect of the present invention, a partial pattern having a value, obtained by adding a projection value of a row or a column to a projection value of a surrounding row or column, equal to or above a predetermined value is detected as a line forming a rectangle, and a result of combining a plurality of the lines of a rectangle is regarded as candidates for ruled lines.

Thus, even if an original image is oblique, a candidate for a ruled line can be extracted with high precision from the original image, and the reliability in the ruled line extraction process can be improved.

According to a further aspect of the present invention, lines of a rectangle in a predetermined range are integrated before computing the convexity/concavity.

When a long-distance search is made, a pattern indicating almost no shifts in search direction is probably a ruled line. Therefore, a ruled line can be extracted with high precision.

According to a further aspect of the present invention, when a candidate for a ruled line is different in length from a surrounding candidate for a ruled line, it is determined whether or not the candidate for a ruled line having the different length is a part of a ruled line based on the convexity/concavity of the portion having the candidate for a ruled line of different length.

Thus, it can be distinguished with high precision whether the portion different in length from surrounding candidates for ruled lines is a part of a ruled line or a character touching a ruled line. Even if a listing is formed by irregular lengths of ruled lines, a ruled line can be extracted from the listing with high precision.

Figure 2A:
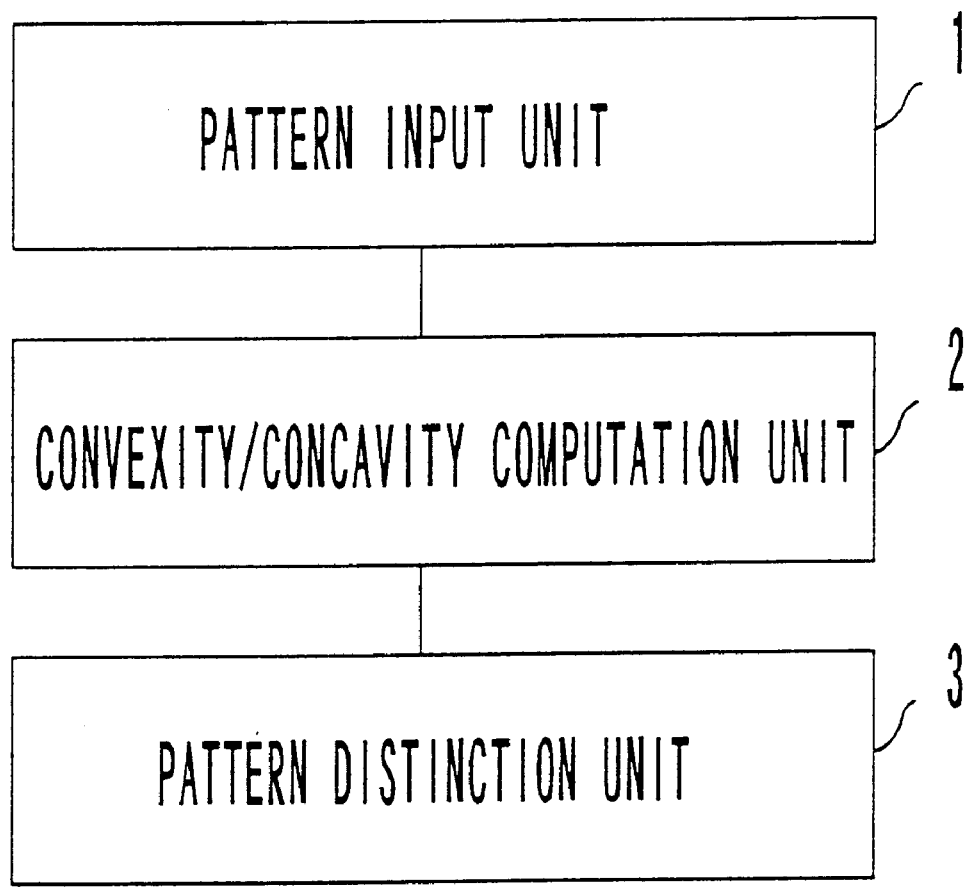
FIG. 2A is a block diagram showing the configuration of the pattern extraction apparatus according to the first embodiment of the present invention.

FIG. 2A is a block diagram showing the functional configuration of the pattern extraction apparatus according to the first embodiment of the present invention.

In FIG. 2A, a pattern input unit 1 inputs a pattern. A convexity/concavity computation unit 2 computes the convexity/concavity of the pattern input to the pattern input unit 1. The pattern distinction unit 3 distinguishes the attribute of the pattern input to the pattern input unit 1 based on the convexity/concavity computed by the convexity/concavity computation unit 2.

When the convexity/concavity computation unit 2 computes the convexity/concavity of the pattern, the convexity/concavity can be computed based on, for example, the frequency of shifts of the pattern in the pattern search direction. The convexity/concavity can be also computed based on the number of patterns intersecting in the search direction.

When the pattern distinction unit 3 distinguishes the attribute of the pattern, it assumes that a pattern having a convexity/concavity value equal to or below a predetermined value forms part of a ruled line, and a pattern having a convexity/concavity value equal to or above a predetermined value forms part of a character.

By computing the convexity/concavity of a pattern, a pattern having small convexity/concavity such as a ruled line, a straight line, etc. can be distinguished from a pattern having large convexity/concavity such as a character, a symbol, etc., and a character, a symbol, etc. entered in a listing can be correctly extracted. Therefore, the precision of the character recognizing process can be improved.

Figure 2B:
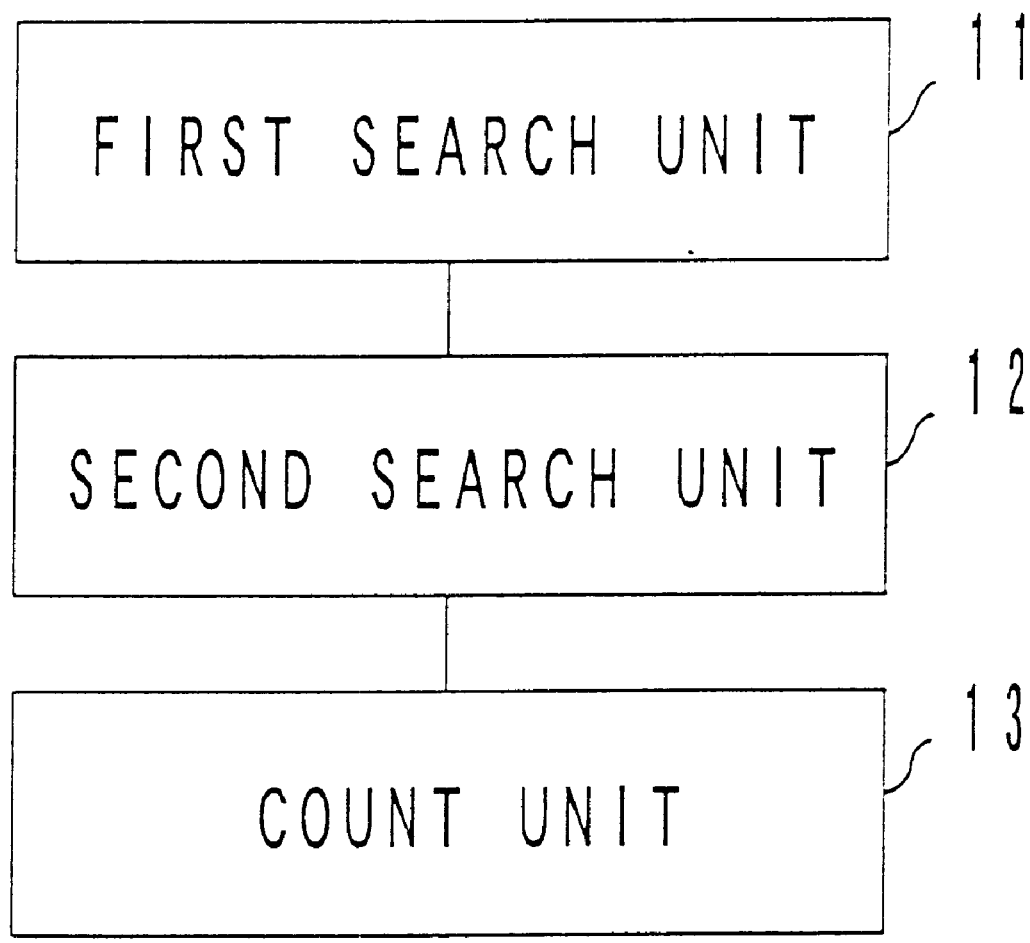
FIG. 2B is a block diagram showing an example of the configuration of the convexity/concavity computation unit shown in FIG. 1.

FIG. 2B is a block diagram showing the functional configuration of the convexity/concavity computation unit 2 shown in FIG. 2A.

In FIG. 2B, a first search unit 11 searches for a pixel in a predetermined direction. When no adjacent pixels are found in the predetermined direction, a second search unit 12 searches for a pixel in a direction different from the predetermined direction. A count unit 13 counts the number of searches for a pixel by the second search unit 12.

The first search unit can compensate for a broken pattern by searching for pixels with a space having a value equal to or below a predetermined value ignored.

The count unit 13 can adjust the number of searches for pixels by the second search unit 12 depending on the obliqueness of the pattern, and the number of searches for pixels by the second search unit can be regulated by the length of the searched pattern.

By computing the convexity/concavity of a pattern based on the frequency of shifts in the search direction, the convexity/concavity of the pattern can be detected in the process of searching both ends of the pattern. Thus, both ends of the pattern can be searched for and simultaneously the convexity/concavity of the pattern can be detected, thereby efficiently obtaining the convexity/concavity of the pattern.

Figure 3:
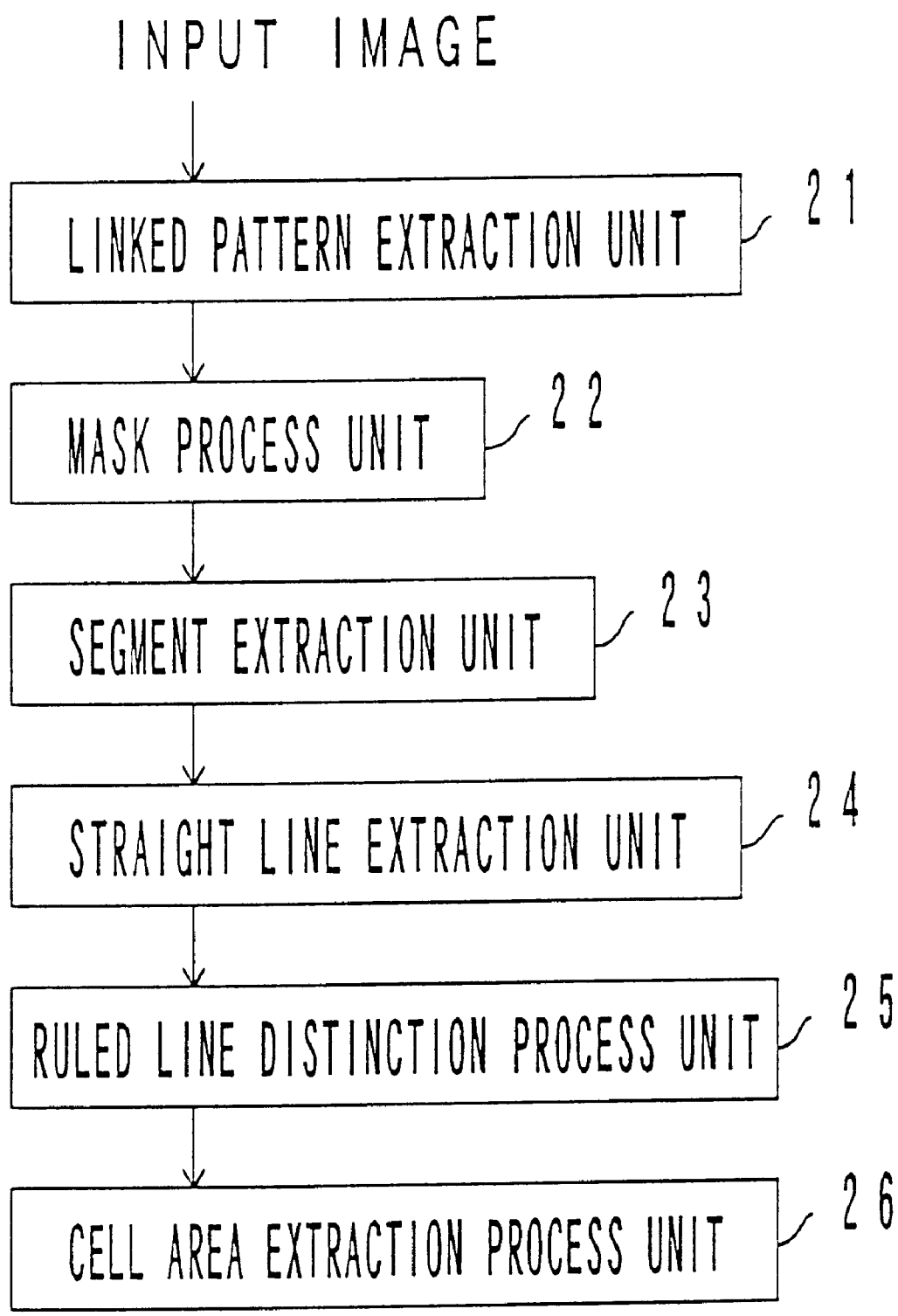
FIG. 3 is a block diagram showing the configuration of the pattern extraction apparatus according to the second embodiment of the present invention.

FIG. 3 is a block diagram showing the functional configuration of the pattern extraction unit according to the second embodiment of the present invention.

In FIG. 3, a linked pattern extraction unit 21 extracts a partial pattern formed by linked pixels from an input original image data.

A mask process unit 22 removes a pattern of diagonal elements which do not form part of a ruled line by performing a masking process on a partial pattern extracted by the linked pattern extraction unit 21 using a vertical or horizontal mask. A segment extraction unit 23 extracts a rectangular area having high density of pixels as a candidate for a ruled line by performing a contiguous projection process on the masked partial pattern.

A straight line extraction unit 24 extracts a straight line by integrating adjacent rectangular areas extracted by the segment extraction unit 23.

A ruled line distinction process unit 25 searches a partial pattern in an area of a candidate for a ruled line, and computes the convexity/concavity of the partial pattern based on the frequency of shifts in the search direction. In the partial pattern in the area of a candidate for a ruled line, a partial pattern having small convexity/concavity is assumed to form part of a candidate for a ruled line.

A cell area extraction process unit 26 extracts a rectangular area encompassed by four ruled lines as a cell to exclude a candidate for a ruled line not forming part of the cell from the candidates for ruled lines determined as ruled lines by the ruled line distinction process unit 25.

Figure 4:
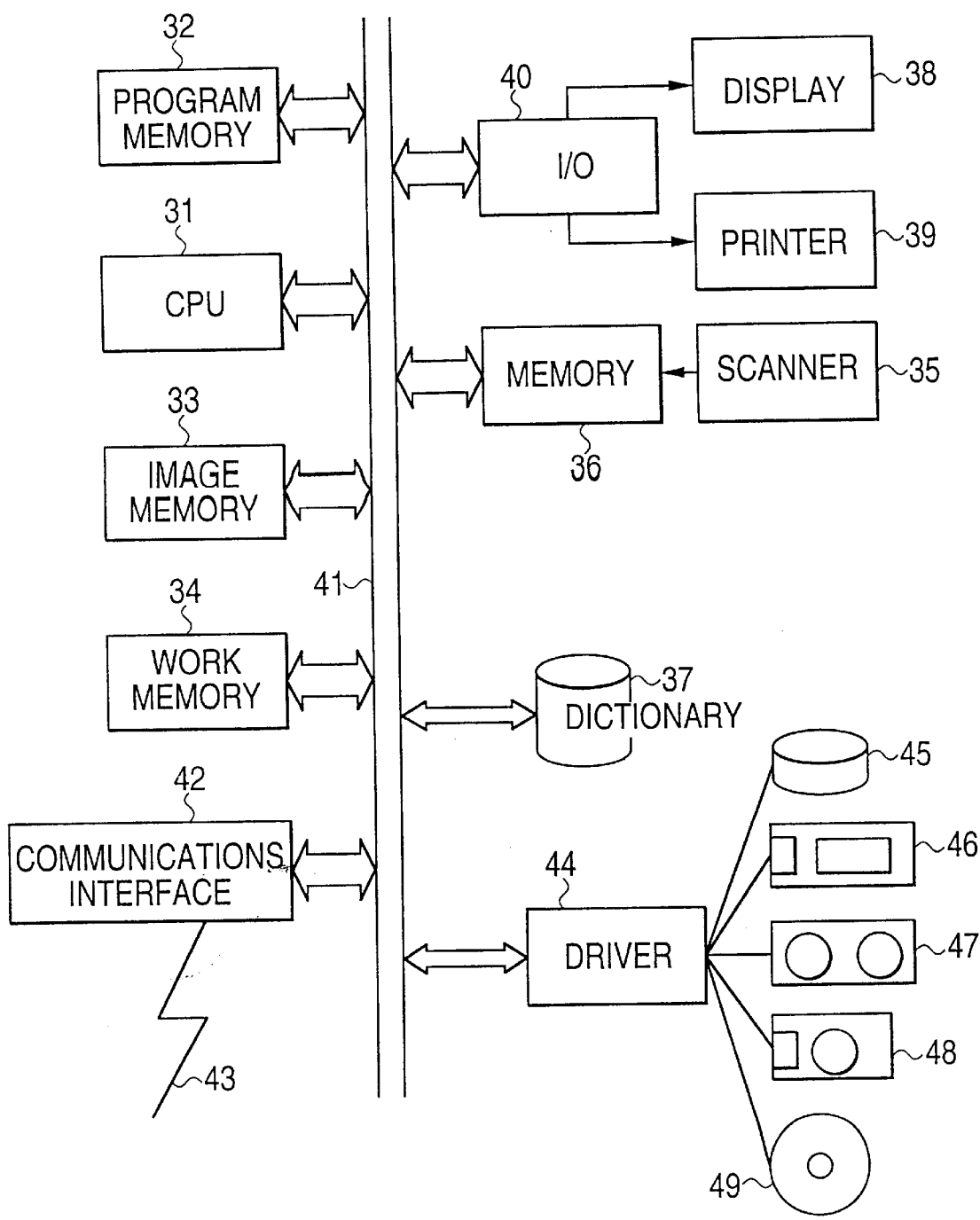
FIG. 4 is a block diagram showing the configuration of the system of the pattern extraction apparatus according to an embodiment of the present invention.

FIG. 4 is a block diagram showing the configuration of the character recognition system to which the pattern extraction apparatus shown in FIG. 3 is applied.

In FIG. 4, a central processing process (CPU) 31 performs an entire process. A program memory 32 stores a program to be executed by the CPU 31. An image memory 33 stores image data in a bit map format. A work memory 34 is used in an image process. A scanner 35 optically reads an image. A memory 36 temporarily stores the information read by the scanner 35. A dictionary file 37 stores the feature of each character image. A display 38 displays a recognition result. A printer 39 prints the recognition result. An input/output interface 40 functions between the display 38 and the printer 39. A bus 41 connects the CPU 31, the program memory 32, the image memory 33, the work memory 34, the memory 36, the dictionary file 37, the input/output interface 40, and the driver 44. A communications interface 42 transmits and receives data and a program through a communications network 43. A driver 44 drives a hard disk 45, an IC memory card 46, a magnetic tape 47, a floppy disk 48, or an optical disk 49 such as CD-ROM, DVD-ROM, etc.

The character recognition system temporarily stores the image data read from the scanner 35 in the memory 36, develops the image data in the image memory 33 in a bit map format, and performs a pattern extracting process on the binary image data copied from the image memory 33 to the work memory 34. Based on the result, the system segments the character image from the image data read by the scanner 35, compares the feature of the segmented character image with the feature data stored in the dictionary file 37, and recognizes a character. Then, the recognition result is output to the display 38 or the printer 39.

In the character recognition system, the pattern extraction apparatus shown in FIG. 3 functions under the control of the CPU 31 which executes the program stored in the program memory 32. The program for performing a pattern extracting process can be preliminarily stored in the ROM of the program memory 32. After the program for performing a pattern extracting process is loaded to the RAM of the program memory 32 from the storage medium such as the program memory 32, the image memory 33, the work memory 34, the scanner 35, the memory 36, etc., the program can be executed by the CPU 31.

Furthermore, the program for performing a pattern extracting process can be obtained from the communications network 43 through the communications interface 42. As the communications network 43 connected to the communications interface 42, wireless communications network, etc. such as a LAN (local area network), a WAN (wide area network), an Internet, an analog telephone network, a digital telephone network (ISDN: integrated service digital network), a PHS (personal handy-phone system), satellite communications, etc. can be used.

The pattern extraction apparatus shown in FIG. 3 is concretely explained below.

The linked pattern extraction unit 21 performs a labelling process on an input pattern of an original image, labels each of the 8-direction-linked patterns, and retrieves a partial pattern having the largest circumscribing rectangle in the partial patterns. An 8-direction-linked partial pattern has specific pixels linked to adjacent pixels, if there are the adjacent pixels, in eight directions, that is, vertically, horizontally, and diagonally, but not linked to adjacent pixels, if there are not the adjacent pixels. The original image is a binary image without extreme obliqueness.

By extracting an 8-direction-linked partial pattern through a labelling process, a linked pattern can be extracted independent of the relative relationship of the positions of a plurality of rectangular boxes.

Figure 5:
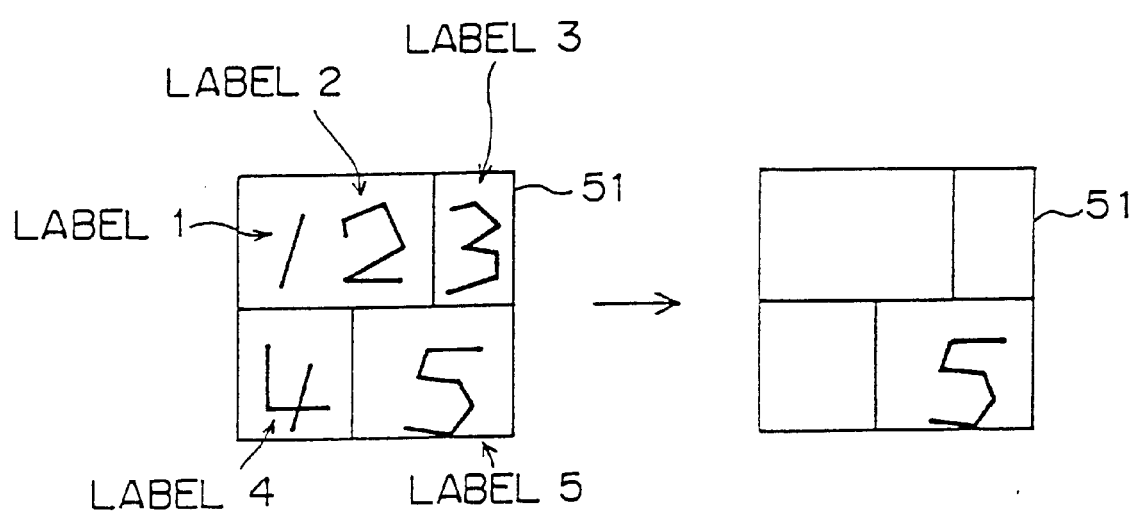
FIG. 5 shows a method of extracting a linked pattern according to an embodiment of the present invention.

For example, assuming that, as shown on the left of FIG. 5, the image containing the numbers 1, 2, 3, 4, and 5 within the rectangular boxes of a listing 51 is input to be processed, the numbers 1 through 4 are assigned labels 1 through 4 respectively. The number 5 touches the listing 51, and the number 5 and the listing 51 is regarded as a linked pattern which is assigned label 5. Since the size of the partial pattern obtained by the labelling process is required in a later process, the coordinates of the vertexes of the rectangle obtained by setting the partial pattern as an approximate rectangle are computed and stored during the labelling process.

Next, as shown on the right of FIG. 5, a partial pattern which is assigned label 5 and has the largest circumscribing rectangle in the partial patterns is retrieved.

The mask process unit 22 removes extremely oblique elements from a partial pattern having a predetermined size of a partial pattern extracted by the linked pattern extraction unit 21, and performs a process for easily extracting a long straight line only existing as a side of a rectangular box.

Figure 6A:
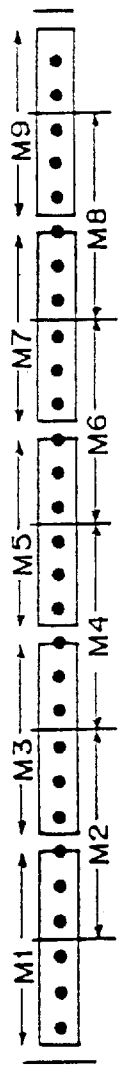
FIGS. 6A through 6C show a method of performing a masking process according to an embodiment of the present invention.

For example, when a horizontal element is extracted as shown in FIG. 6A, horizontal masks M1 through M9 specifying the rectangular ranges each or which is 1 vertical pixel×6 horizontal pixels are used. To keep the space between the lines obtained as a result of a masking process, the ranges for the masking process are set in such a way that they overlap each other.

Figure 6B:
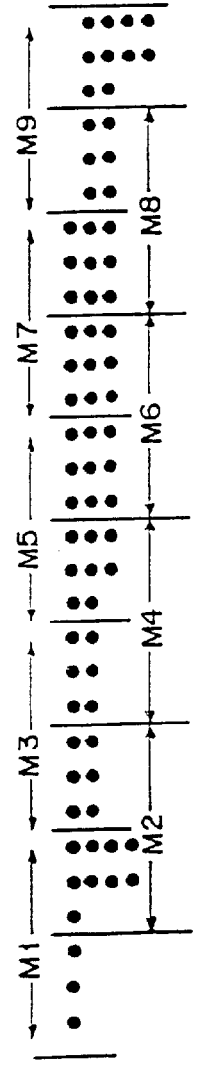

Next, for example, the proportion of the black pixels in the masks M1 through M9 to the entire original image shown in FIG. 6B is computed. If the proportion is above a predetermined value, all the pixels in the masks M1 through M9 are regarded as black pixels. If the proportion is equal to or below the predetermined value, all the pixels in the masks are regarded as white pixels. When the original image is scanned using a horizontal mask, the pixels horizontally arranged have a larger proportion in the mask, and those diagonally arranged have a smaller proportion in the mask. Therefore, an extremely oblique element existing in the original image can be removed, and the horizontal pixels can be efficiently extracted.

Figure 6C:
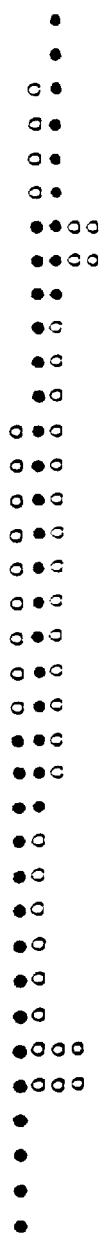

As a result, the horizontal pixels indicated by the black dots can be extracted as shown in FIG. 6C, the diagonal elements can be removed, and the line width can be levelled.

When the vertical elements are extracted, for example, a vertical mask specifying a rectangular area of 6 vertical pixels×1 horizontal pixel is used.

FIG. 7 shows the result of the masking process according to an embodiment of the present invention.

Figures 7A, 7B:
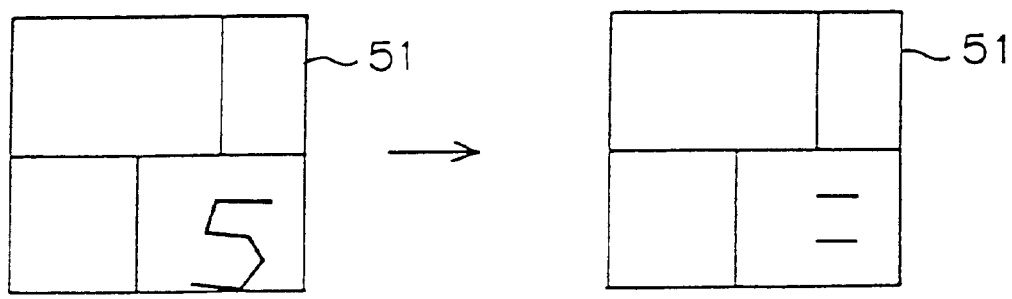
FIGS. 7A and 7B show a result of the masking process according to an embodiment of the present invention.

In FIG. 7A, the partial pattern extracted by the linked pattern extraction unit 21 and assigned label 5 contains, for example, the number 5 which touches the listing 51 and is a pattern not forming part of the rectangular box. The entire image of the partial pattern is scanned using two types of masks, that is, a horizontal mask and a vertical mask. Then, the proportion of the pattern to the mask is computed. If the proportion is above a predetermined value, then it is assumed that the mask is filled with the pattern. If the proportion is equal to or below the predetermined value, then the pattern in the mask is removed and the vertical and horizontal elements are extracted. When a plurality of rows or columns are continuously occupied by the black pixels in the mask at a proportion higher than a predetermined value, then a rectangular area is formed by the entire rows or columns with the center line defined as a process result.

As a result, as shown in FIG. 7B, a pattern 52 can be obtained with its diagonal elements removed and with its line width levelled, thereby easily extracting the rectangular box. The original image is stored separately from the masked image.

Figure 8:
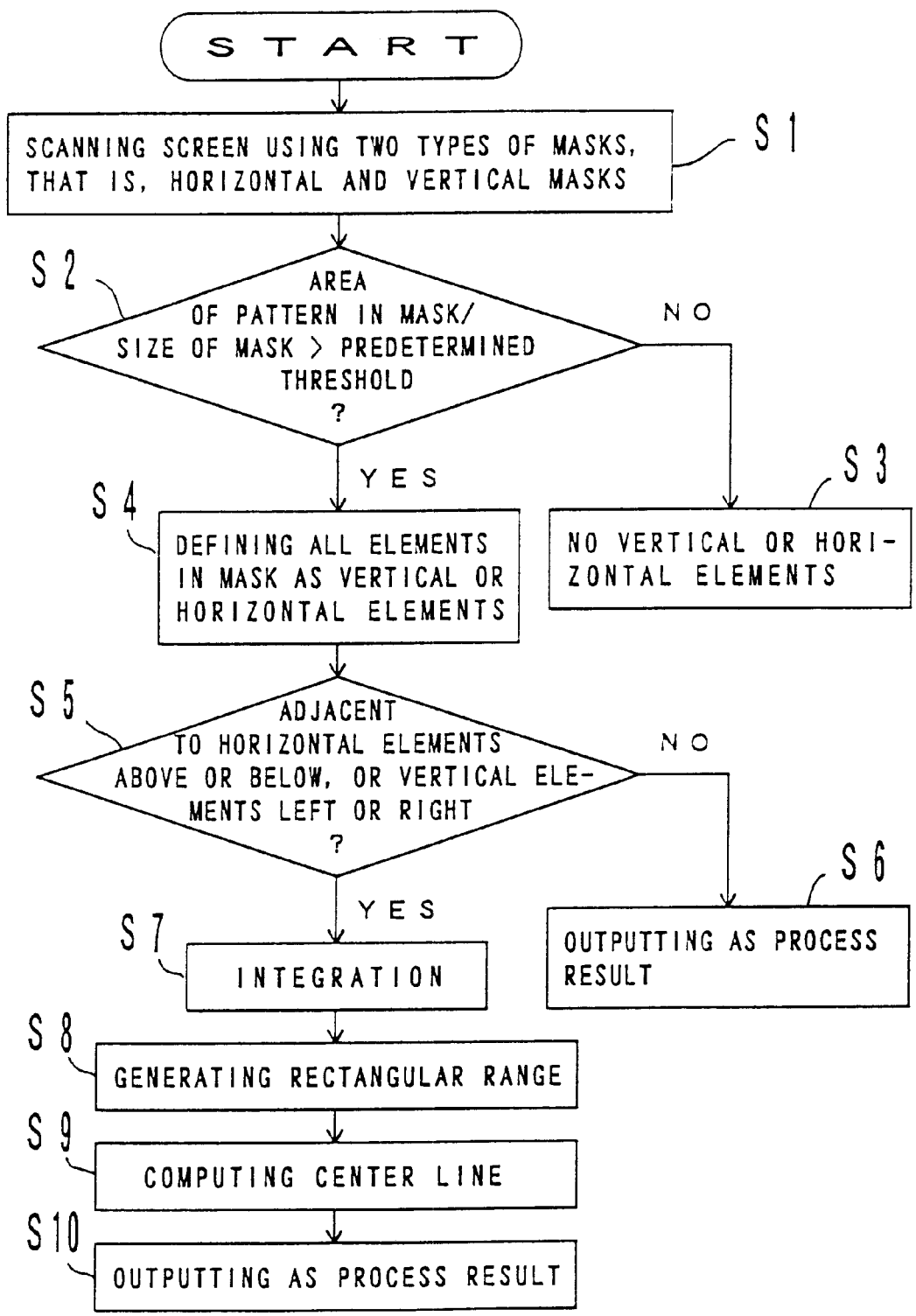
FIG. 8 is a flowchart showing the masking process according to an embodiment of the present invention.

FIG. 8 is a flowchart showing the masking process according to an embodiment of the present invention.

In FIG. 8, the original image of the partial pattern obtained by the linked pattern extraction unit 21 is scanned using two types of masks, that is, a horizonal mask and a vertical mask in step Sl.

Next, in step S2, the proportion of the pattern to the mask, that is, the area of the pattern in the mask to the area of the mask is computed. It is distinguished whether or not the proportion is above a predetermined value. If it is distinguished that the proportion of the pattern to the mask is below the predetermined value, then control is passed to step S3, it is assumed that there are no vertical or horizontal elements and the process terminates.

If it is distinguished in step S2 that the proportion of the pattern to the mask is above the predetermined value, then control is passed to step S4, it is assumed that the mask is completely occupied by the pattern and the pattern is filled with the vertical or horizontal elements.

Then, in step S5, it is distinguished whether or not the elements obtained in step S4 touch the elements above, below, left or right. If it is distinguished that they do not touch the elements above, below, left or right, then control is passed to step S6 and the elements obtained in step S4 are output as a process result.

If it is distinguished in step S5 that the elements touch the elements above, below, left or right, then control is passed to step S7 and the adjacent elements are integrated. In step S8, a rectangular area is generated from the elements integrated in step S7. In step S9, the center line of the rectangular area obtained in step S8 is output as a process result.

The line extraction unit 23 horizontally and vertically divides a masked pattern into a plurality of areas. The contiguous projection of the pattern in each area obtained by horizontally and vertically dividing the masked pattern is computed, and a part of a predetermined length of line or a straight line is detected through an approximate rectangular. The contiguous projection refers to a sum of a projection value of a target row or a target column and a projection value of a surrounding row or column. The projection value of a target row or a target column is obtained as a sum of the black pixels in the row or the column. Through the contiguous projection, a straight line can be correctly detected even when the straight line is oblique and exists over a plurality of rows or columns. Thus, when a large rectangular box such as a block rectangular box, etc. is detected, a straight line forming part of the rectangular box can be detected even if the rectangular box is oblique.

Figure 9:
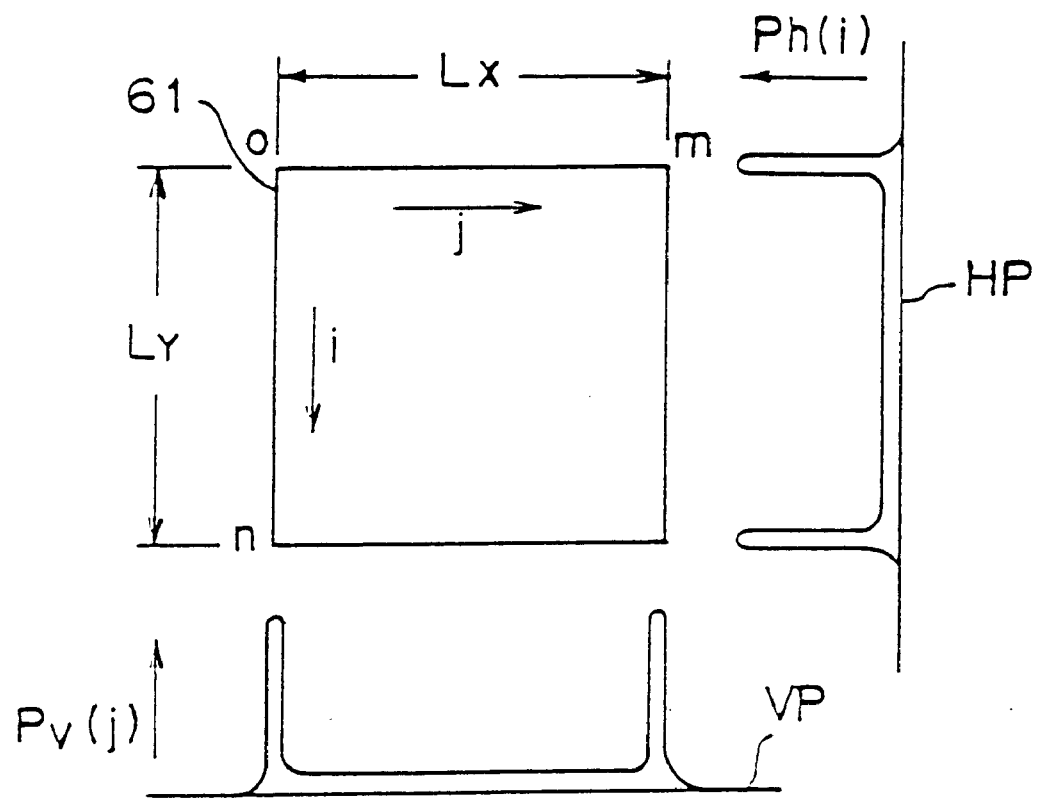
FIG. 9 shows a result of projecting lines forming a rectangle.

FIG. 9 shows the result of projecting a rectangular box.

If the vertical length and the horizontal length of a rectangular box 61 are respectively LY and LX in FIG. 9, the projection value Ph(i) in the horizontal direction j is PH(i), and the projection value Pv(j) in the vertical direction i is PV(j), then HP(1)=HP(n)=m, HP(2) through HP(n−1)=2, VP(1)=VP(m)=n, and VP(2) through VP(m−1)=2.

Thus, since the projection value of the portion where a straight line forming part of the rectangular box 61 is large, the straight line forming part of the rectangular box 61 can be extracted by computing the projection value.

Figure 10:
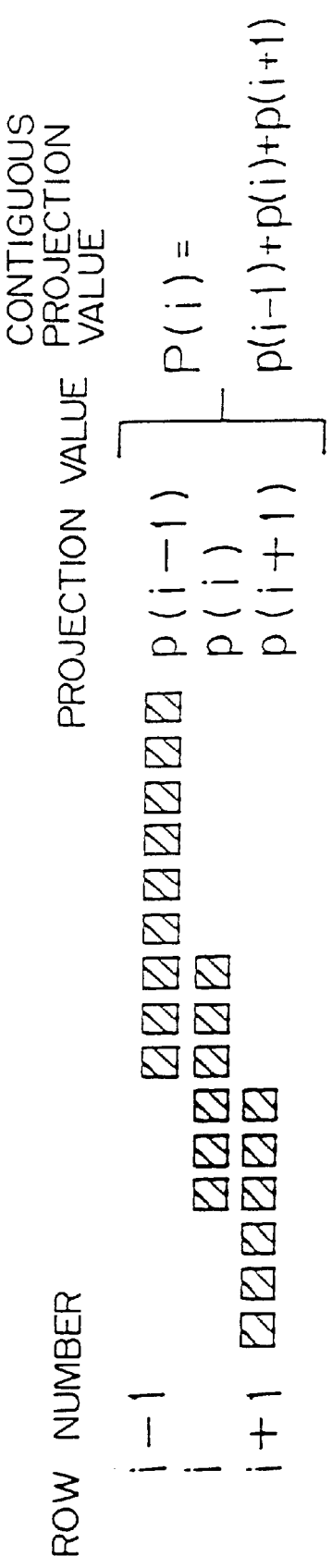
FIG. 10 shows a contiguous projection method according to an embodiment according to the present invention.

FIG. 10 shows the contiguous projection method according to an embodiment of the present invention.

In FIG. 10, assuming that the projection value of row i is p(i), the contiguous projection value P(i) can be computed by equation (1).

$$P(i)=p(i-j)+ \ldots +p(i)+ \ldots +p(i+j) \quad (1)$$

For example, if j=1 in equation (1) in FIG. 10, then p(i−1)=9 because there are nine black pixels in row i−1, p(i)=6 because there are six black pixels in row i, and p(i+1)=6 because there are six black pixels in row i+1. As a result, P(i)=p(i−1)+p(i)+p(i+1)=21.

Thus, since the straight line is oblique, the contiguous projection value of the oblique straight line is large when the straight line exists over a plurality of rows or columns. Therefore, even when a rectangular box is oblique, the straight line forming part of the rectangular box can be efficiently detected.

Figure 11:
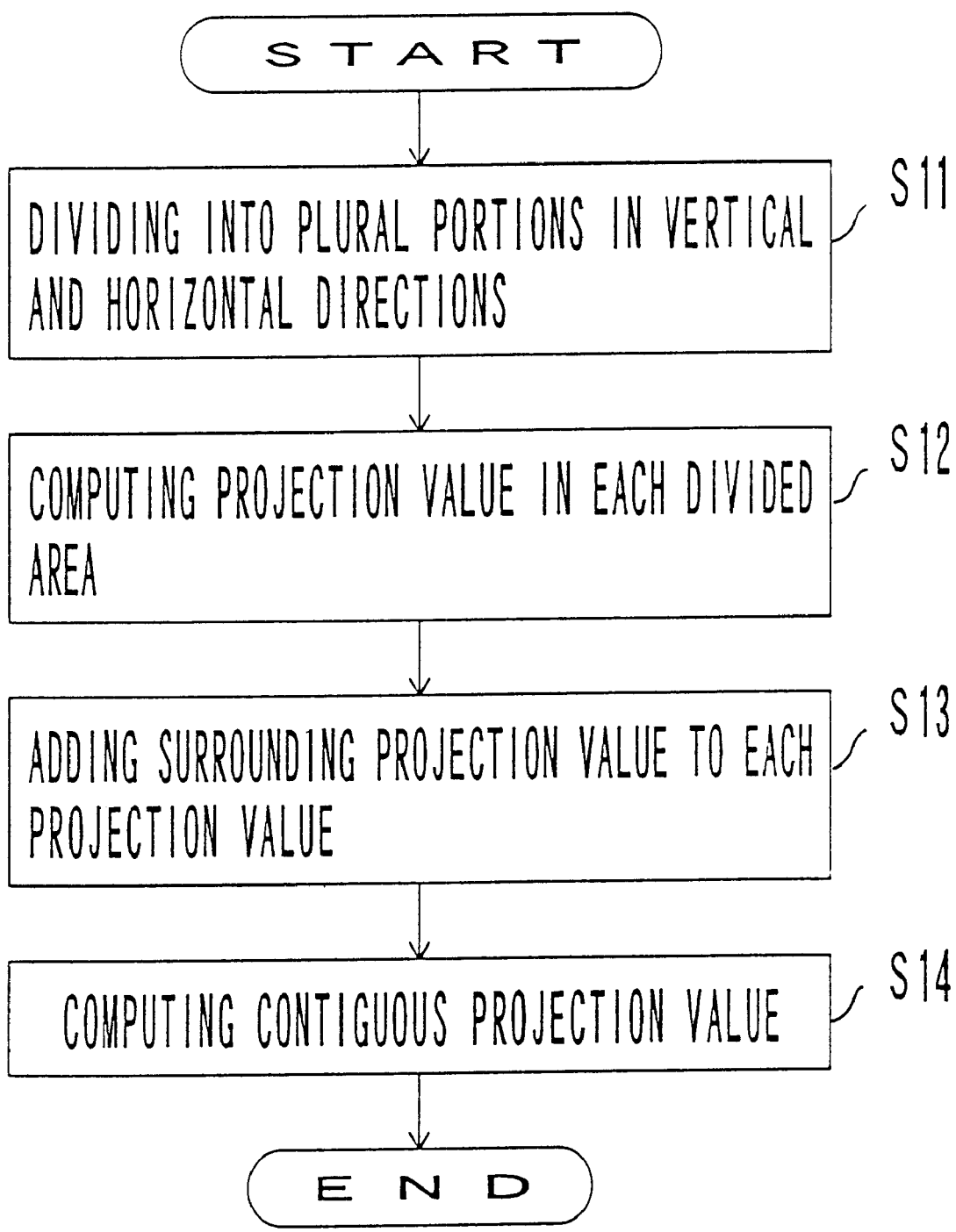
FIG. 11 is a flowchart showing a contiguous projection process according to an embodiment of the present invention.

FIG. 11 is a flowchart showing the contiguous projection process according to an embodiment of the present invention.

In step S11 shown in FIG. 11, the partial patterns assigned the same label by the mask process unit 22 are horizontally and vertically divided into a plurality of areas.

Then, in step S12, the projection value is computed in each of the divided areas in the horizontal and vertical directions.

In step S13, each of the projection values computed in step S12 is added to the projection value of the surrounding area.

In step S14, the contiguous projection value P(i) is computed based on equation (1).

The line extraction unit 23 detects through an approximate rectangle a part of a predetermined length of line or a straight line in the horizontal and vertical directions based on the contiguous projection value for the masked image of a partial pattern.

That is, the portion where the proportion of the contiguous projection value of a divided partial pattern to the length of a vertically and horizontally divided area is equal to or above a threshold is a position of a candidate for a straight line. When a plurality of continuous rows or columns indicate values equal to or above a predetermined threshold, the rectangle range containing the plural continuous rows or columns is assumed to be the position where a candidate for a straight line exists. A part of the predetermined length of a line or a straight line detected through an approximate rectangle is referred to as a line forming part of a rectangle.

Figure 12:
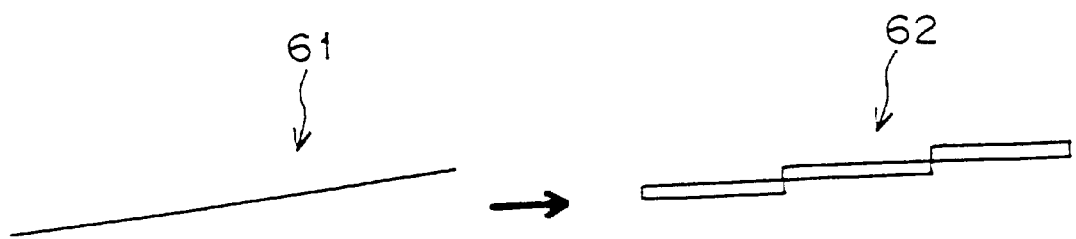
FIG. 12 shows a segment extracting method according to an embodiment of the present invention.

For example, as shown on the left of FIG. 12, the oblique horizontal line 61 is divided into three parts, and the position indicating a contiguous projection value equal to or above a threshold is computed. As a result, as shown on the right of FIG. 12, three horizontally-divided lines 62 forming part of a rectangle can be obtained.

When the position of the oblique horizontal line 61 is detected in the normal projection method, not in the contiguous projection process, the projection value is small. Therefore, the oblique horizontal line 61 cannot be detected. On the other hand, when the number of divisions of a partial pattern is increased with the length of a division shortened to detect the oblique horizontal line 61 in the normal projection method, many short straight lines forming part of a character are detected, thereby making it difficult to distinguish a character from a rectangular box.

If the contiguous projection method is used, the contiguous projection value can be large with the division length of a partial pattern not extremely shortened even when the line 61 is oblique. Therefore, a relatively long straight line forming part of a rectangular box can be distinguished from a short straight line forming part of a character, and can be correctly detected.

FIG. 13 is a flowchart showing the line extracting process according to an embodiment of the present invention.

In FIG. 13, it is determined in step S21 whether or not the proportion of the contiguous projection value of a divided partial pattern to each of the vertical and horizontal division lengths is equal to or above a predetermined threshold. If the proportion of the contiguous projection value of a divided partial pattern to each of the vertical and horizontal division lengths is below a predetermined threshold, then control is passed to step S22 and it is assumed that there are no segments.

If it is distinguished in step S21 that the proportion of the contiguous projection value of a divided partial pattern to each of the vertical and horizontal division lengths is equal to or above a predetermined threshold, then control is passed to step S23 and it is assumed that there is a segment.

Then, it is distinguished in step S24 whether or not the pattern assumed to be a segment in step S23 touches a line above or below. If it is distinguished that the pattern does not touch the segment above or below, control is passed to step S25, and it is assumed that the pattern is a segment forming part of a rectangle.

If it is distinguished in step S24 that the pattern assumed to be a segment in step S23 touches a segment above or below, then control is passed to step S26 and the pattern assumed to be a segment is integrated into the segments above and below. In step S27, the segment integrated in step S26 is detected as a segment forming part of a rectangle.

The straight line extraction unit 24 integrates adjacent lines forming part of a rectangle among the segments forming part of a rectangle detected by the segment extraction unit 23, makes long straight lines, and approximates a rectangle from the integrated straight lines.

Figure 14A:
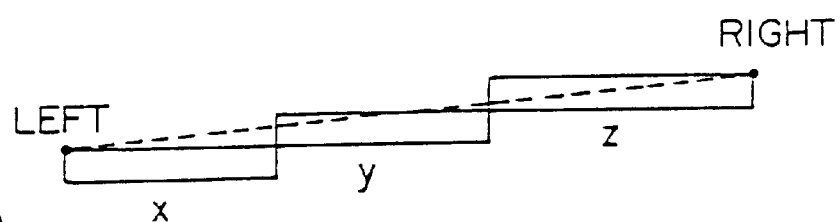
FIGS. 14A and 14B show a segment integration method according to an embodiment of the present invention.
Figure 14B:
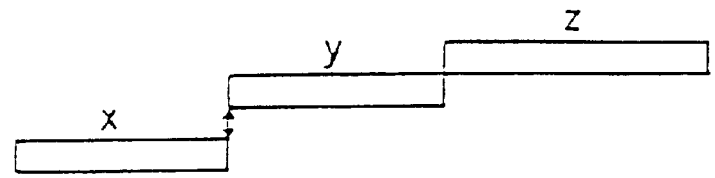

For example, when unbroken lines x, y, and z forming part of a rectangle touch or are connected to each other as shown in FIG. 14A, the lines x, y, and z forming part of a rectangle are integrated into each other and become a long straight line. When the lines x and y forming part of a rectangle are not connected to each other as shown in FIG. 14B, the lines x, y, and z forming part of a rectangle are integrated to make a long straight line if the vertical space between the lines x and y forming part of a rectangle is below the number of rows or columns added in the contiguous projection process.

The obliqueness of a detected straight line is computed from the coordinates of both ends of the integrated line, and a straight line having the obliqueness different from that of another straight line is regarded as an oblique deletion line, etc. which does not form part of a rectangular box, and is removed from among candidates for straight lines.

Figure 15:
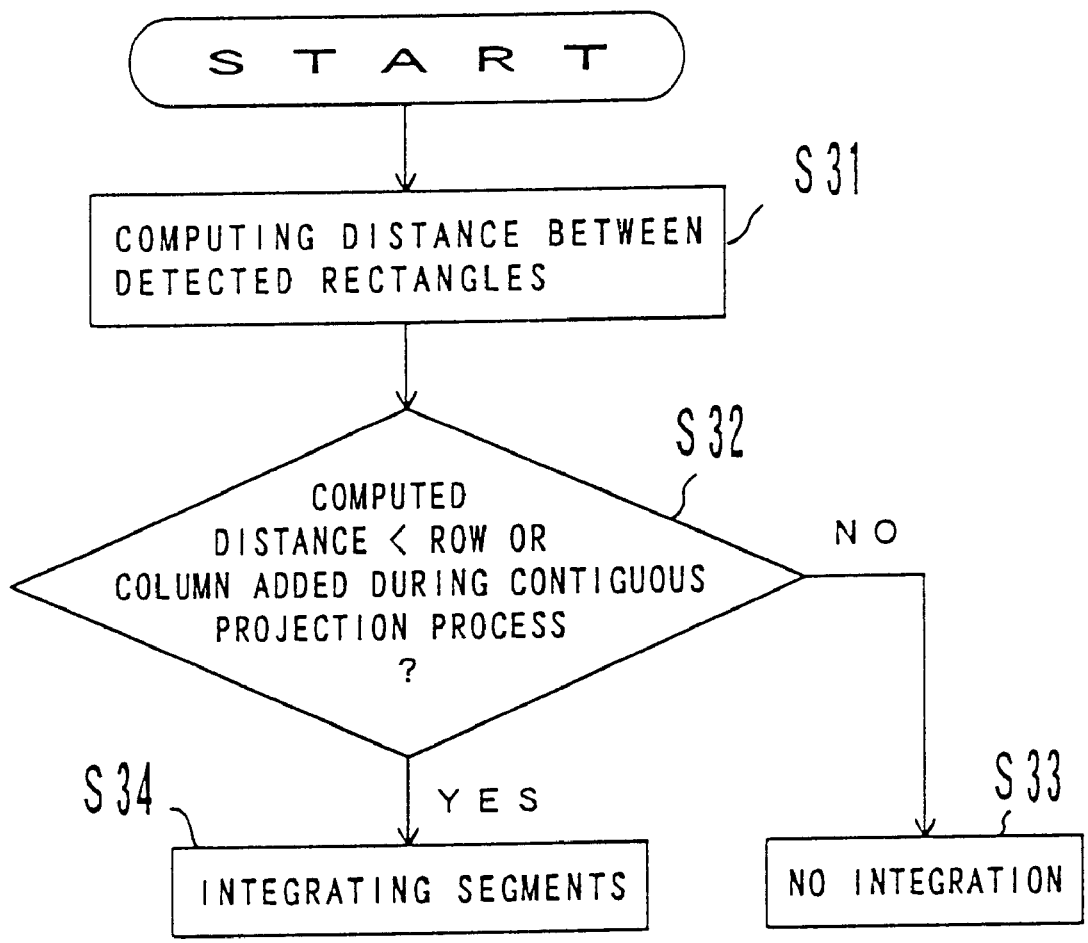
FIG. 15 is a flowchart showing a segment integration process according to an embodiment of the present invention.

FIG. 15 is a flowchart showing the line integrating process according to an embodiment of the present invention.

In FIG. 15, the distance between the segments forming part of a rectangle detected by the segment extraction unit 23 is computed in step S31.

Then, in step S32, it is distinguished whether or not the distance between the segments forming part of a rectangle computed in step S31 is within the number of rows or columns j added in the contiguous projection method. If the distance between the segments forming part of a rectangle computed in step S31 is not within the number of rows or columns j added in the contiguous projection method, then control is passed to step S33 and the segments forming part of a rectangle are not integrated.

If it is distinguished in step S32 that the distance between the segments forming part of a rectangle computed in step S31 is within the number of rows or columns j added in the contiguous projection method, then control is passed to step S34, and the segments forming part of a rectangle are integrated.

Figure 16:
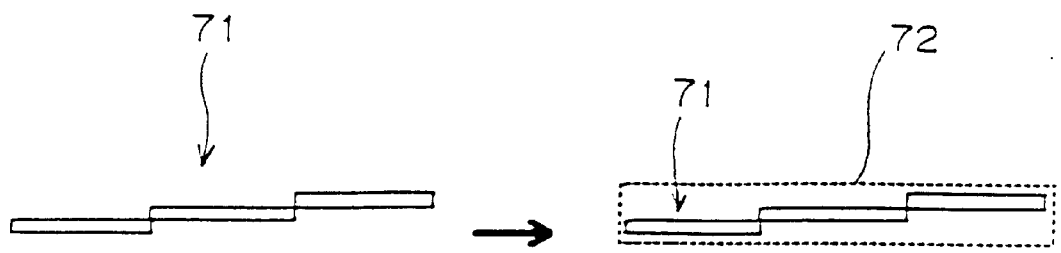
FIG. 16 shows a straight line extracting method according to an embodiment of the present invention.

Then, the straight line extraction unit 24 approximates a rectangle from integrated straight lines, and defines it as a candidate for a ruled line forming a horizontal ruled lines or a vertical ruled lines. For example, in FIG. 16, a candidate for a ruled line 72 can be obtained by approximating a rectangle from the integrated straight lines 71.

In the processes after detecting a segment forming part of a rectangle, an original image before the masking process is used.

Figure 17:
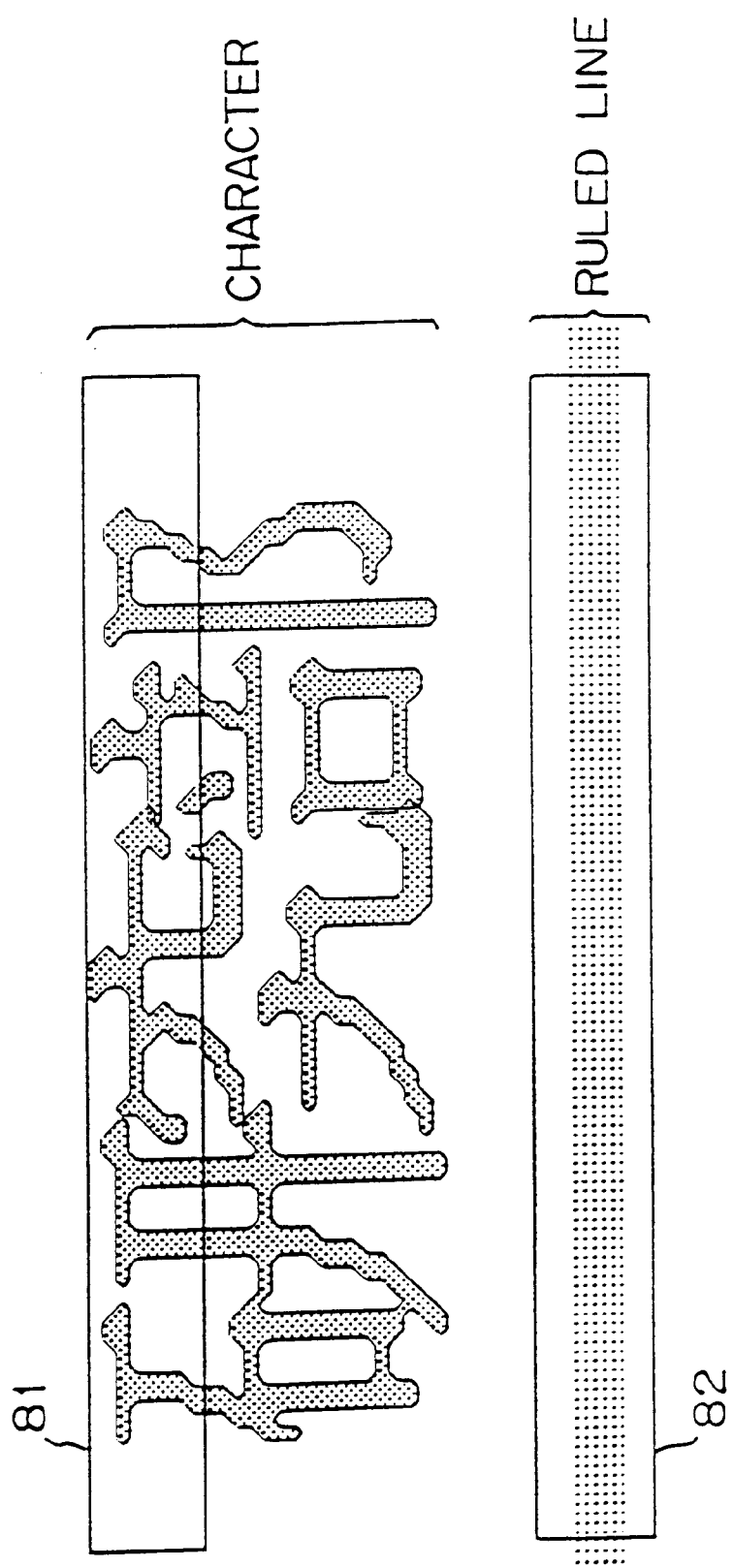
FIG. 17 shows a result of extracting an area of a candidate for a. ruled line according to an embodiment of the present invention.

FIG. 17 shows the result of extracting the area of a candidate for a ruled line according to an embodiment of the present invention.

In FIG. 17, the character string 研究部 is entered above the ruled line, the ruled line is extracted as a ruled line candidate 82, and a part of the character string 研究部 is extracted as a ruled line candidate 81 because the characters 研, 究, and 部 are written close to each other.

When a part of the character string 研究部 extracted as the ruled line candidate 81 is regarded as a ruled line, the character string 研究部 cannot be correctly segmented, and it is difficult to recognize the characters 研, 究, and 部. Therefore, the ruled line distinction process unit 25 determines whether or not the pattern in the ruled line candidates 81 and 82 is actually a ruled line by computing the convexity/concavity of the pattern in the ruled line candidates 81 and 82.

Figure 18:
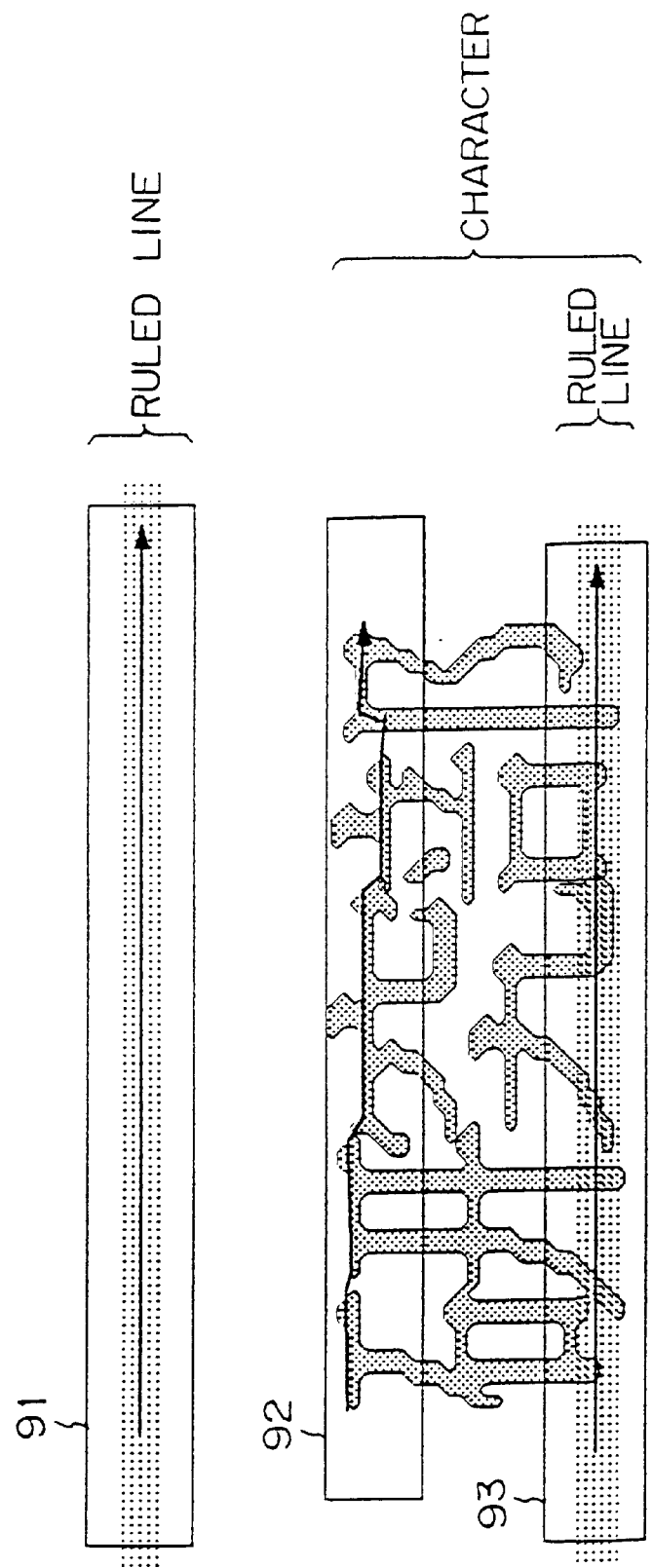
FIG. 18 shows a result of searching a pattern an area of a candidate for a ruled line according to an embodiment of the present invention.

FIG. 18 shows the result of searching an area of a candidate for a ruled line according to an embodiment of the present invention.

In FIG. 18, the character string 研究部 is entered between the ruled lines and the character string 研究部 touches the ruled line below. The ruled line above is extracted as a ruled line candidate 91, and the ruled line below is extracted as a ruled line candidate 93. Since the characters 研, 究, and 部 are close to each other, a part of the character string 研究部 is extracted as a ruled line candidate 92.

The ruled line distinction process unit 25 searches the ruled line candidates 91, 92, and 93 for patterns to correctly detect the right and left ends of a horizontal straight line and the upper and lower ends of a vertical straight line extracted by the straight line extraction unit 24. In this case, the frequency of shifts in the search direction is counted. Since the pattern of the ruled line candidate 91 normally refers to a ruled line, the pattern is straightly searched, and the frequency of shifts in the search direction is small. On the other hand, since the pattern of the ruled line candidate 92 normally refers to a character, the search path is refracted depending on the form of the character, thereby increasing the frequency of shifts in the search direction.

As a result, the pattern having a lower frequency of shifts in the search direction is regarded as a ruled line, and the pattern having a higher frequency of shifts in the search direction is regarded as a non-ruled-line. Thus, the pattern of the ruled line candidate 91 can be recognized as a ruled line, and the pattern of the ruled line candidate 92 can be recognized as a non-ruled-line.

Unless an adjacent pixel is found in the search direction, a pixel is searched for in the diagonal direction. If adjacent pixels are found in the diagonal direction, the search is continued in the same direction. Since the pattern of the ruled line candidate 93 which touches the character string 研究部 indicates a low frequency of shifts of the search direction, the pattern of the ruled line candidate 93 can be recognized as a ruled line.

Figure 19:
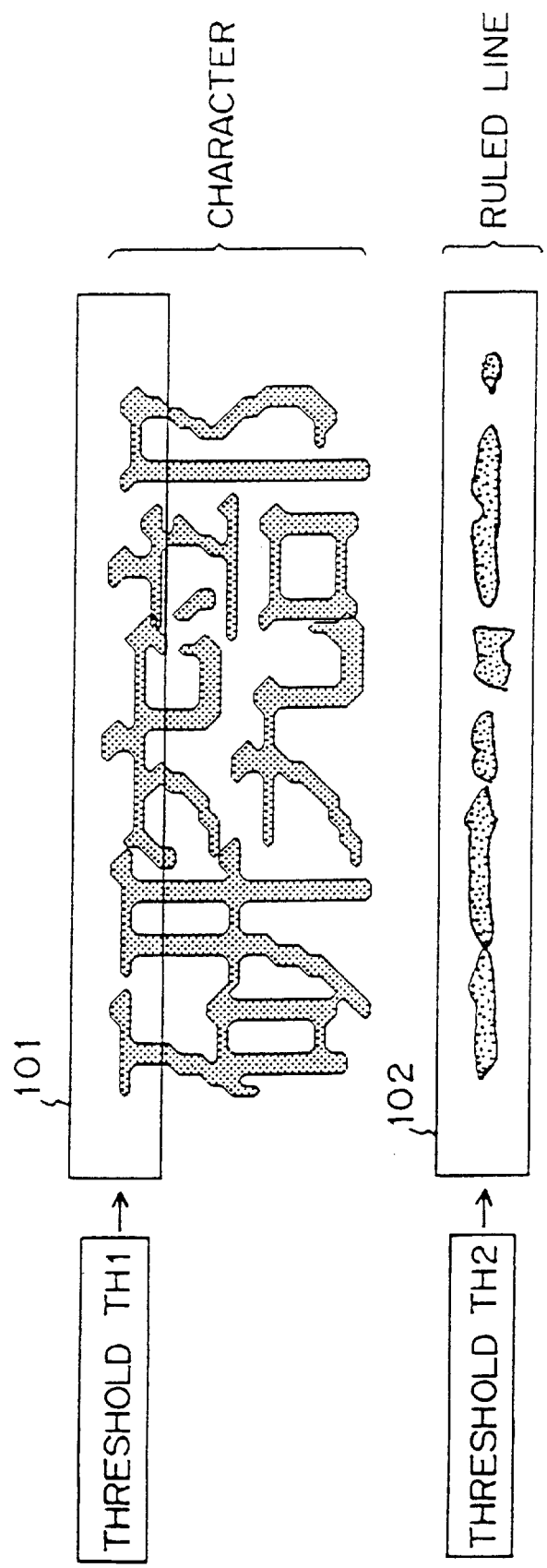
FIG. 19 shows an example of setting a threshold for the convexity/concavity of a pattern according to an embodiment of the present invention.

FIG. 19 shows an example of setting a threshold for the convexity/concavity of a pattern according to an embodiment of the present invention.

In FIG. 19, since a character string 研究部 is entered above the broken ruled line, the broken ruled line is extracted as a ruled line candidate 102, and the characters 研, 究, and 部 are close to each other, a part of the character string 研究部 is extracted as the ruled line candidate 101.

A ruled line candidate 101 is mistakenly extracted from a part of the character string 研究部, and the remaining pattern of the character string 研究部, partially extracted as the ruled line candidate 101 exists near the ruled line candidate 101. Therefore, when there is a pattern near the ruled line candidate 101, the threshold TH1 for the convexity/concavity of the pattern of the ruled line candidate 101 is set small. Thus, a part of the character string 研究部 extracted as the ruled line candidate 101 can be more correctly removed from a candidate for a ruled line.

On the other hand, since the ruled line candidate 102 is correctly extracted from a ruled line and the character string 研究部 is entered separately from the ruled line, no other patterns such as characters, etc. exist near the ruled line candidate 102. Therefore, when no patterns exist near the ruled line candidate 102, the threshold TH2 for the convexity/concavity of the pattern of the ruled line candidate 102 is set large. As a result, the ruled line correctly extracted as the ruled line candidate 102, which is broken and therefore is large in convexity/concavity, can be prevented from being regarded as a non-candidate for a ruled line.

A threshold for distinguishing the convexity/concavity of a pattern can be obtained through experiments using various patterns.

Figure 20:
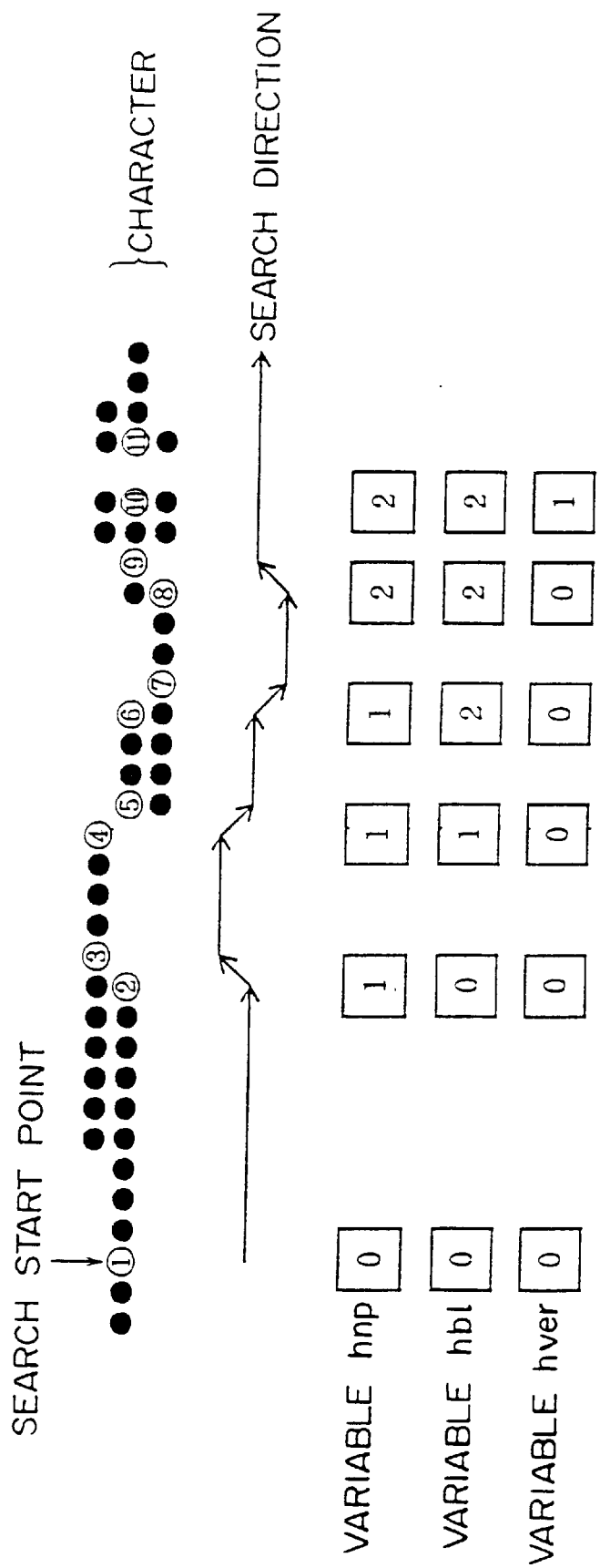
FIG. 20 shows a transition of the frequency of shifts in a search direction when a character is searched according to an embodiment of the present invention.

FIG. 20 shows the transition of the frequency of shifts in the search direction when a character is searched according to an embodiment of the present invention.

In FIG. 20, it is assumed that the pattern of a part of a character is extracted as a candidate for a ruled line and the pattern is formed by black pixels. First, the search start point is set at the black pixel ①, and the search is started with the horizontal search direction set for a horizontal line. The variable hup indicating the frequency of shifts as an ascending segment in the right direction, a variable hb1 indicating the frequency of shifts as a descending segment in the right direction, and a variable hver indicating the frequency of vertical intersections are all set to 0.

Since adjacent black pixels exist on the right of black pixels ① and ②, the search is continued straight in the right direction.

When the search reaches the position of the black pixel ②, no adjacent black pixels are found to the right of the black pixel ② and the adjacent pixels exist diagonally above the black pixel ②. Therefore, the search direction is changed and the search is performed diagonally above from the black pixel ② to the black pixel ③. The variable hup is increased by 1, and the variable hup is changed from 0 to 1.

Since adjacent black pixels exist on the right between the black pixels ③ and ④, the search is performed straight in the right direction.

When the search reaches the position of the black pixel ④, no adjacent black pixels are found to the right of the black pixel ④ and the adjacent pixels exist diagonally below the black pixel ④. Therefore, the search direction is changed and the search is performed diagonally below from the black pixel ④ to the black pixel ⑤. The variable hbl is increased by 1, and the variable hb1 is changed from 0 to 1.

Since adjacent black pixels exist on the right between the black pixels ⑤ and ⑥, the search is performed straight in the right direction.

When the search reaches the position of the black pixel ⑥, no adjacent black pixels are found to the right of the black pixel ⑥ and the adjacent pixels exist diagonally below the black pixel ⑥. Therefore, the search direction is changed and the search is performed diagonally below from the black pixel ⑥ to the black pixel ⑦. The variable hbl is increased by 1, and the variable hb1 is changed from 1 to 2.

Since adjacent black pixels exist on the right of black pixels ⑦ and ⑧, the search is continued straight in the right direction.

When the search reaches the position of the black pixel ⑧, no adjacent black pixels are found to the right of the black pixel ⑧ and the adjacent pixels exist diagonally above the black pixel ⑧. Therefore, the search direction is changed and the search is performed diagonally above from the black pixel ⑧ to the black pixel ⑨. The variable hup is increased by 1, and the variable hup is changed from 1 to 2.

Since adjacent black pixels exist on the right of black pixels ⑨ and ⑩, the search is continued straight in the right direction.

When the search reaches the position of the black pixel ⑩, no adjacent black pixels are found to the right of the black pixel ⑩ and no adjacent pixels exist diagonally above or below the black pixel ⑩. Therefore, it is checked whether or not adjacent pixels exist above or below the black pixel ⑩. As a result, if adjacent pixels exist above and below the black pixel ⑩, then it is assumed that the pattern vertically crosses the search direction and the variable hver is increased by 1. As a result, the variable hver is changed from 0 to 1. If the distance between the black pixel ⑩ and the black pixel ⑪ is equal to or below a predetermined value, then the space between them is ignored and the search reaches the black pixels ⑩ and ⑪, and continues further.

As described above, when a pattern of a part of a character is searched, the search direction depends on the shape of the character.

Figure 21:
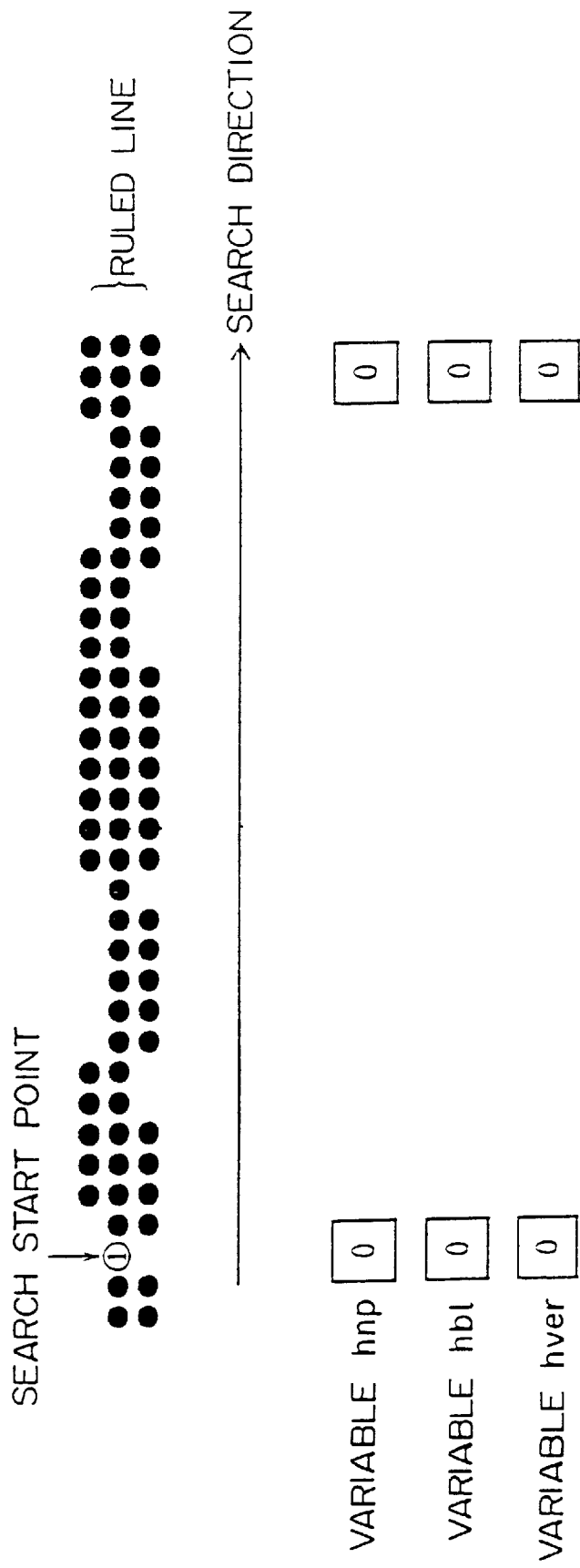
FIG. 21 shows a transition of the frequency of shifts in a search direction when a ruled line is searched according to an embodiment of the present invention.

FIG. 21 shows the transition of the frequency of shifts in the search direction when a ruled line is searched according to an embodiment of the present invention.

In FIG. 21, the pattern forming a ruled line is extracted as a candidate for a ruled line, and is formed by black pixels. First, the search start point is set at the black pixel ①, and the search is started with the horizontal search direction set for a horizontal line. The variable hup indicating the frequency of shifts as an ascending segment in the right direction, a variable hb1 indicating the frequency of shifts as a descending segment in the right direction, and a variable hver indicating the number of vertical intersections are all set to 0.

The search start point is a black pixel existing at the finest portion of the pattern of a candidate for a ruled line because the thickest portion of the pattern possibly refer to the area where the character touches the ruled line. If the search starts from the thickest portion, the ruled line may not be correctly searched for.

If the search starts from the black pixel ①, adjacent pixels continuously exist in the search direction. Therefore, the search is performed straight with the variables hup, hbl, and hver remaining 0.

When a pattern forming part of a ruled line is searched, a change of the search direction is rarely detected.

Figure 22:
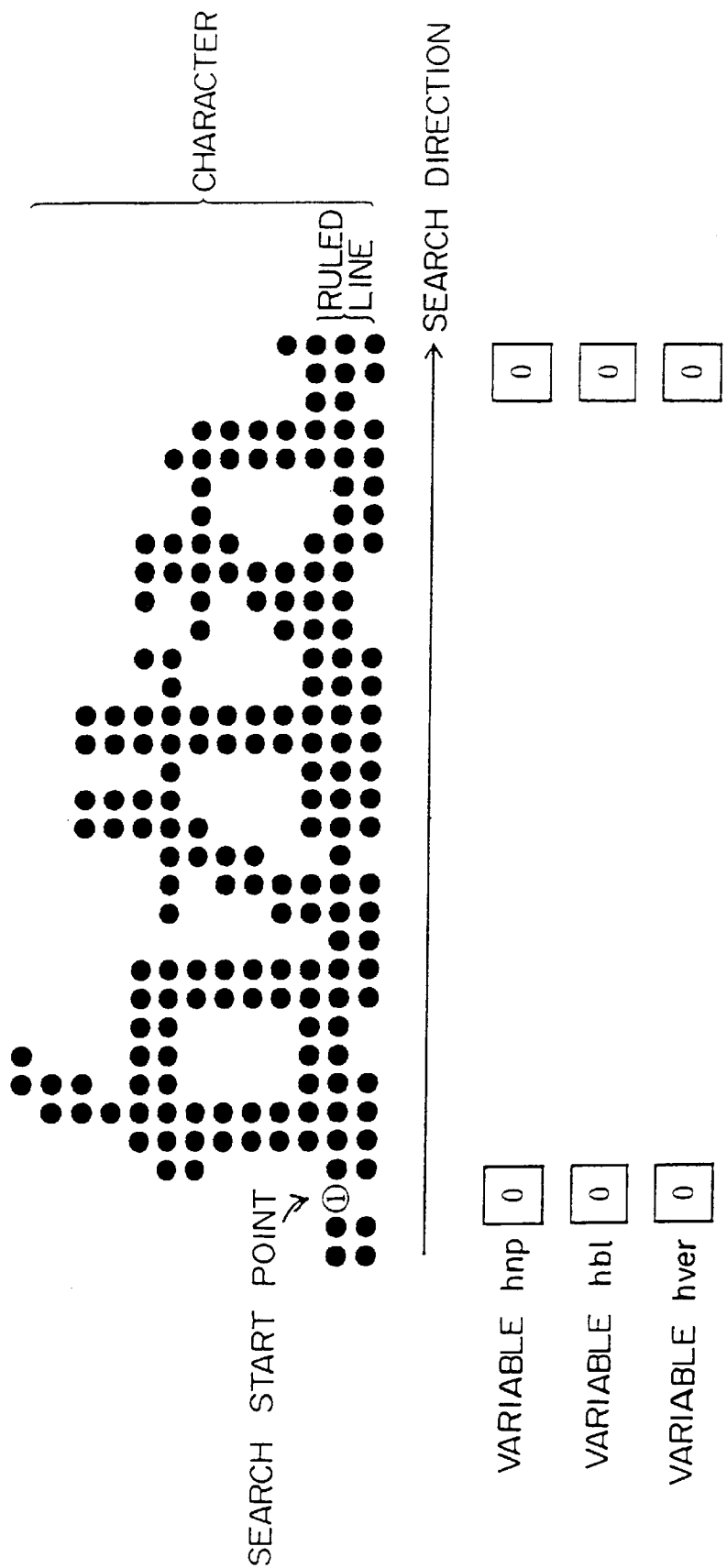
FIG. 22 shows a transition of the frequency of shifts in a search direction when a ruled line touching a character is searched according to an embodiment of the present invention.

FIG. 22 shows the transition of the frequency of shifts of the search direction when a ruled line touching a character is searched according to an embodiment of the present invention.

In FIG. 22, the pattern forming a ruled line is extracted as a candidate for a ruled line, and is formed by black pixels. The ruled line touches a character. First, the search start point is set at the black pixel ①, and the search is started with the horizontal search direction set for a horizontal line. The variable hup indicating the frequency of shifts as an ascending segment in the right direction, a variable hbl indicating the frequency of shifts as a descending segment in the right direction, and a variable hver indicating the number of vertical intersections are all set to 0.

The search start point is a black pixel existing at the finest portion of the pattern of a candidate for a ruled line because the thickest portion of the pattern possibly refer to the area where the character touches the ruled line. If the search starts from the thickest portion, the ruled line may not be correctly searched for.

If the search starts from the black pixel ①, adjacent pixels continuously exist in the search direction. Therefore, the search is performed straight with the variables hup, hbl, and hver remaining 0.

Thus, when adjacent pixels exist in the search direction, the search direction is not changed. As a result, even if a ruled line touches a character, the convexity/concavity of the ruled line can be checked and the precision of the extraction of a ruled line can be improved.

Figure 23:
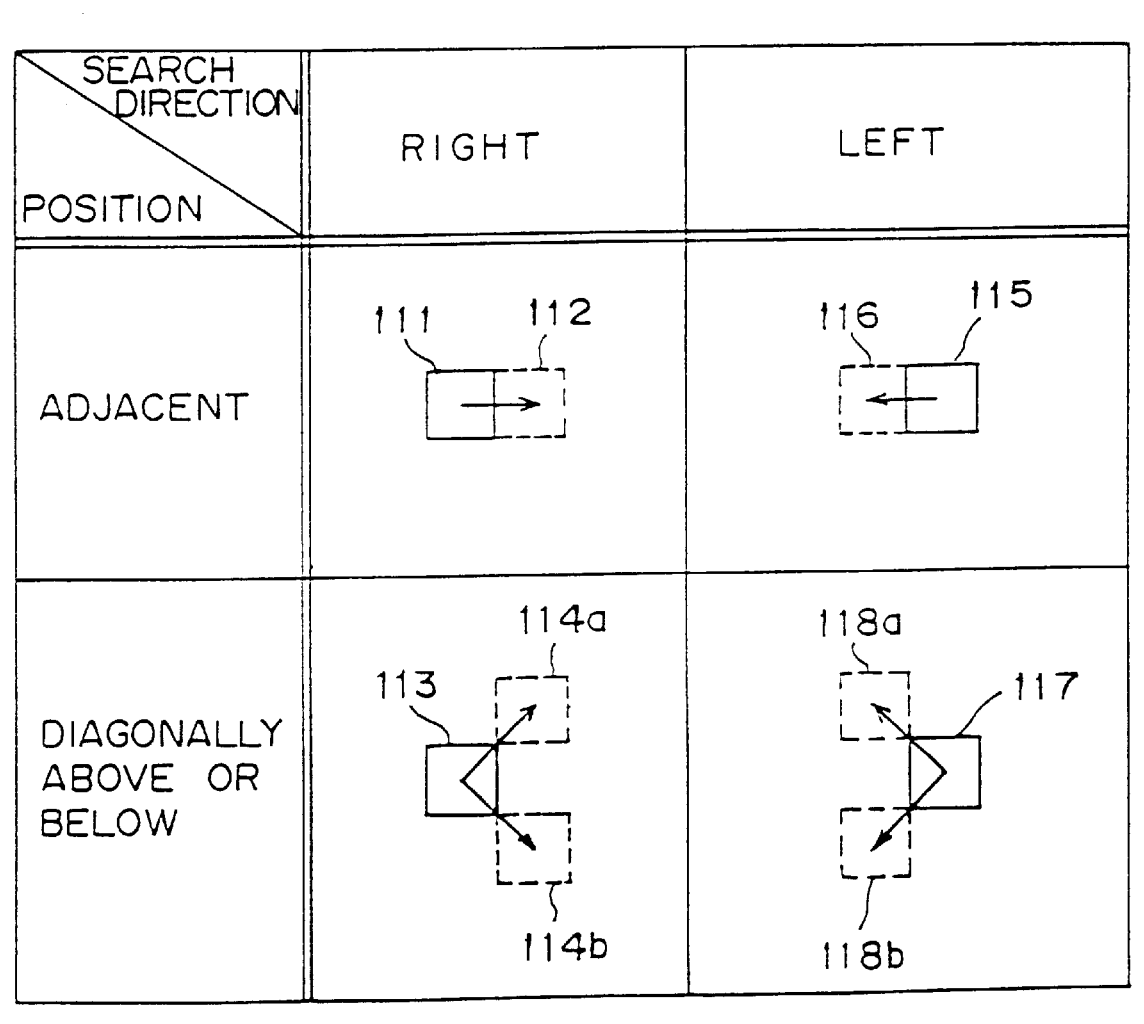

FIG. 23 shows the search direction for pixels according to an embodiment of the present invention.

In FIG. 23, when pixels are searched for in the right direction, the search is performed toward a pixel 112 adjacent to a current pixel 111. Only when no pixels are adjacent to a current pixel 113, a pixel 114*a* obliquely above the current pixel 113 or a pixel 114b obliquely below the current pixel 113 is searched for.

On the other hand, when pixels are searched for in the right direction, the search is performed toward current pixel 115. Only when no pixels are adjacent to a current pixel 117, a pixel 118a obliquely above the current pixel 117 or a pixel 118b obliquely below the current pixel 117 is searched for.

Figure 24:
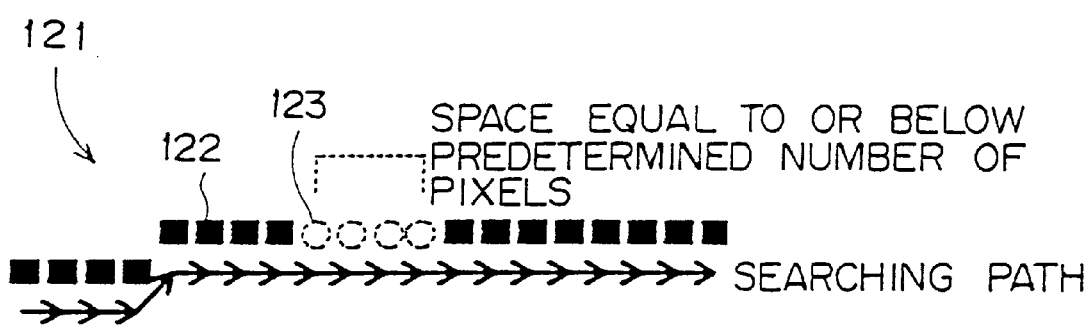
FIG. 24 shows a method of searching a broken pattern according to an embodiment of the present invention.

FIG. 24 shows a method of searching a broken pattern according to an embodiment of the present invention.

In FIG. 24, when a pixel 122 forming part of a straight line 121 approximated as a rectangle is retrieved, it is assumed that the pixel 122 exists in a blank area 123 having the number of pixels equal to or below a predetermined number. The coordinates of the left and right ends of the pixel 122 obtained in the above described retrieval replace the left and right ends of the rectangle-approximated straight line 121.

Thus, by performing the search with a space having a value below a predetermined value ignored, the convexity/concavity of a pattern can be computed even if the pattern is broken and separated.

Figure 25:
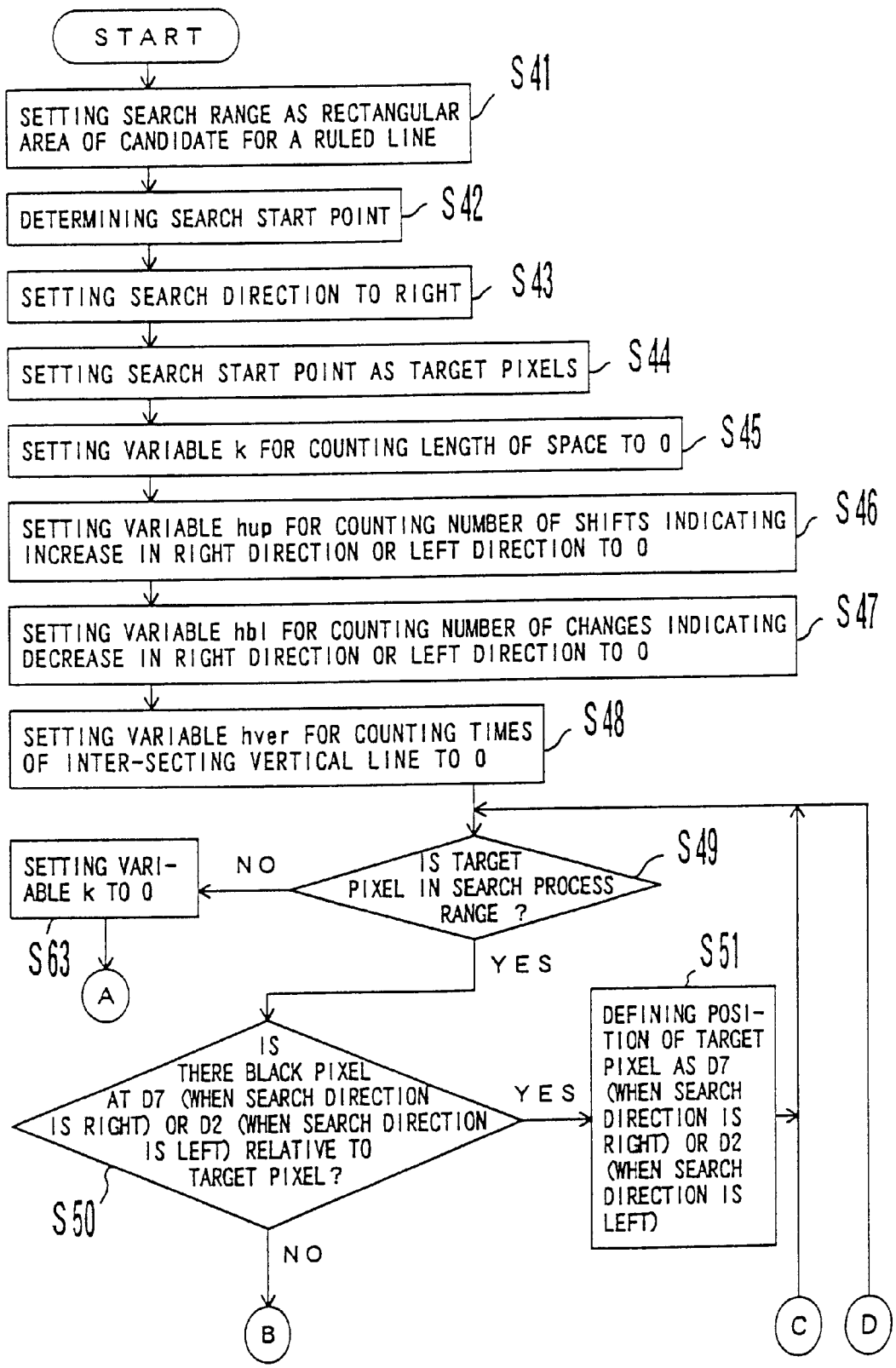
FIG. 25 is a flowchart showing a convexity/concavity computation process according to an embodiment of the present invention.
Figure 26:
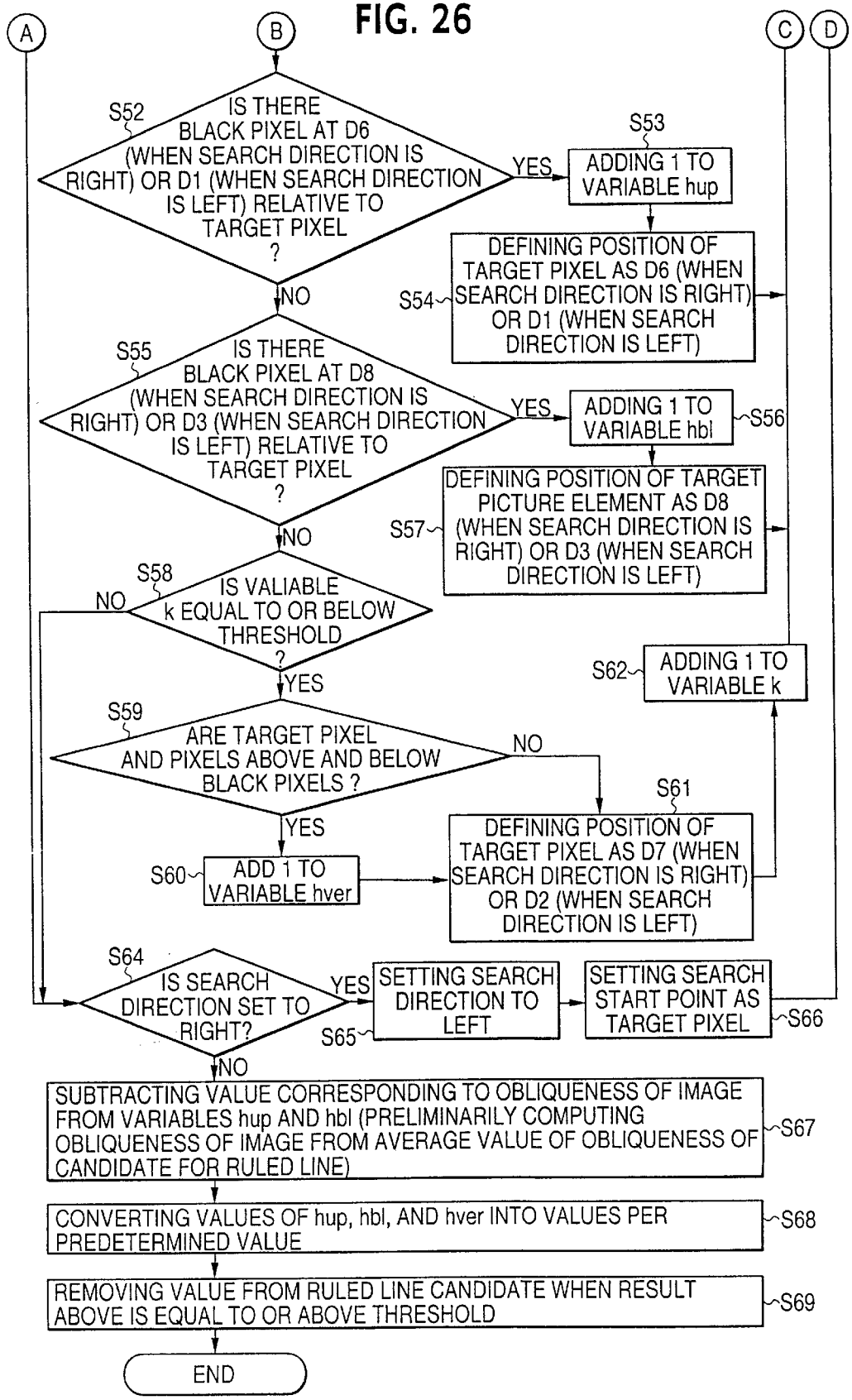
FIG. 26 is a flowchart showing a convexity/concavity computation process according to an embodiment of the present invention.

FIGS. 25 and 26 are flowcharts showing the convexity/concavity computing process according to an embodiment of the present invention. The flowcharts show the case where the search is performed in the horizontal direction.

In FIG. 25, a rectangular area of a candidate for a ruled line is set as a search range in step S41. Then, in step S42, the coordinates of the finest portion in the rectangular area of the candidate for a ruled line are computed in the horizontal direction, and the center point of the pattern at the coordinates of the finest portion in the horizonal direction is computed. The center point of the pattern is set as the search start point. The finest portion of the pattern is set as the search start point because the finest portion is probably a ruled line, and a S straight line forming part of a rectangular box can be searched with high probability.

Then, in step S43, it is set that the straight line search direction is right.

In step S44, the search start point set in step S42 is set as a target pixel.

In step S45, the initial value of the variable k for counting the length of a blank area is set to 0.

In step S46, the variable hup for counting the frequency of shifts in search direction as an ascending or descending segment is set to 0.

Then, as shown in step S47, the variable hbl for counting the frequency of shifts in search direction as an ascending or descending segment is set to 0.

Then, as shown in step S48, the variable hver for counting the frequency of shifts in search direction as an ascending or descending segment is set to 0.

FIG. 27 shows the arrangement of the pixels according to an embodiment of the present invention.

In FIG. 27, a target pixel is marked with x. D1 is an adjacent pixel diagonally left above the target pixel. D2 is an adjacent pixel to the left of the target pixel. D3 is an adjacent pixel diagonally left below the target pixel. D4 is an adjacent pixel above the target pixel. D5 is an adjacent pixel below the target pixel. D6 is an adjacent pixel diagonally right above the target pixel. D7 is an adjacent pixel to the right of the target pixel. D8 is an adjacent pixel diagonally right below the target pixel. When the search starts from the target pixel and reaches the pixel D6, the search direction changes as an ascending segment in the right direction. When the search starts from the target pixel and reaches the pixel D8, the search direction changes as a descending segment in the right direction. When the search starts from the target pixel and reaches the pixel D1, the search direction changes as an ascending segment in the left direction. When the search starts from the target pixel and reaches the pixel D3, the search direction changes as a descending segment in the left direction.

In step S49, it is distinguished whether or not the target pixel is in the rectangular area of the pattern to be searched. If the target pixel is not in the rectangular area of the pattern to be searched, then control is passed to step S63, the variable k for counting the length of a blank area is set to 0, and control is passed to step S64.

If it is distinguished in step S49 that the target pixel is in the rectangular area of the pattern to be searched, then control is passed to step S50, and it is distinguished whether or not a black pixel is positioned at D7. If a black pixel is positioned at D7, then control is passed to step S51, and the pixel at the position D7 is set as a target pixel. If a black pixel is positioned at D7 relative to the target pixel, then the search proceeds in the right direction.

If no black pixel is positioned at D7 relative to the target pixel, then control is passed to step S52, and it is distinguished whether or not a black pixel is positioned at D6 relative to the target pixel. If a black pixel is positioned at D6, then control is passed to step S53, the variable hup is increased by 1, control is passed to step S54, and the pixel at the position D6 is set as a target pixel. Thus, the search direction changes as an ascending segment in the right direction, and the frequency of shifts in search direction as an ascending segment in the right direction is counted. After the target pixel is moved to the position of D6, the processes in steps S49 through S51 are repeated.

If it is distinguished in step S52 that no black pixel is positioned at D6, then control is passed to step S55, and it is distinguished whether or not a black pixel is positioned at D8 relative to the target pixel. If a black pixel is positioned at D8, then control is passed to step S56, the variable hb1 is increased by 1, control is passed to step S57, and the pixel at the position D8 is set as a target pixel. Thus, the search direction changes as a descending segment in the right direction, and the frequency of shifts in the search direction as a descending segment in the right direction is counted. After the target pixel is moved to the position of D8, the processes in steps S49 through S51 are repeated.

If it is distinguished in step S55 that no black pixel is positioned at D8, then control is passed to step S58, and it is distinguished whether or not the variable k for counting the length of a blank area is equal to or below a threshold. If the variable k for counting the length of a blank area is equal to or below a threshold, then control is passed to step S59, and it is distinguished whether or not a target pixel is a black pixel and the black pixel exists at the position of D4 and D5 relative to the target pixel.

If a target pixel is a black pixel and the black pixel exists at the position of D4 and D5 relative to the target pixel, then it is assumed that the vertical line is crossed, control is passed to step S60, the variable hver is increased by 1, control is passed to step S61, and the pixel at the position of D7 is a target pixel.

If the target pixel is a black pixel and a black pixel does not exist at the positions of D4 and D5 relative to the target pixel, then control is passed to step S61 and the pixel at the position of D7 is a target pixel.

In step S62, the variable k for counting the length of a blank area is increased by 1, and control is passed to step S49.

If it is distinguished in step S58 that the variable k for counting the length of a blank area is above a threshold, then control is passed to step S64, and it is distinguished whether or not the search direction is right. If the search direction is right, then, control is passed to step S65, the search direction is switched to left, control is passed to step S66, and the search start point distinguished in step S42 is set as a target pixel. Then, control is passed to step S49 and the search is performed in the left direction.

If it is distinguished in step S64 that the search direction is not right, then control is passed to step S67, and the obliqueness of the image is amended by subtracting the value of the obliqueness of the image from the variables hup and hb1. The value of the obliqueness of an image is preliminarily computed from an average value for the obliqueness of a candidate for a ruled line.

Then, in step S68, the variables hup, hbl, and hver are converted into a value for a predetermined length.

When the variable hup, hbl, or hver converted into a value for a predetermined length is equal to or above a threshold, the pattern is removed from candidates for ruled lines in step S69.

The variables hup, hbl, and hver are added up, the sum is converted into a ratio to the length of a straight line, and the value can be specified as the amount of a change of a target straight line.

The horizontal search has been described by referring to the flowcharts shown in FIGS. 25 and 26. Similarly, the vertical search can be performed by changing the search direction from a horizontal search to a vertical search.

The length of an allowable blank can be changed depending on the size of each partial pattern, thereby reducing the possibility that a segment forming part of a character is mistakenly recognized as ruled line of a rectangular box.

Described above according to the above described embodiment is the computation of the convexity/concavity of a straight line extracted by the straight line extraction unit 24. Similarly, the convexity/concavity of the segment extracted by the segment extraction unit 23 can be computed.

The cell area extraction process unit 26 distinguishes a straight line forming part of a rectangular box from the candidate for a ruled line distinguished by the ruled line distinction process unit 25, and extracts a rectangular range encompassed above, below, right, and left by a rectangular box.

FIGS. 28A, 28B, 28C, and 28D show the cell extracting process according to an embodiment of the present invention.

Figures 28A, 28B, 28C, 28D:
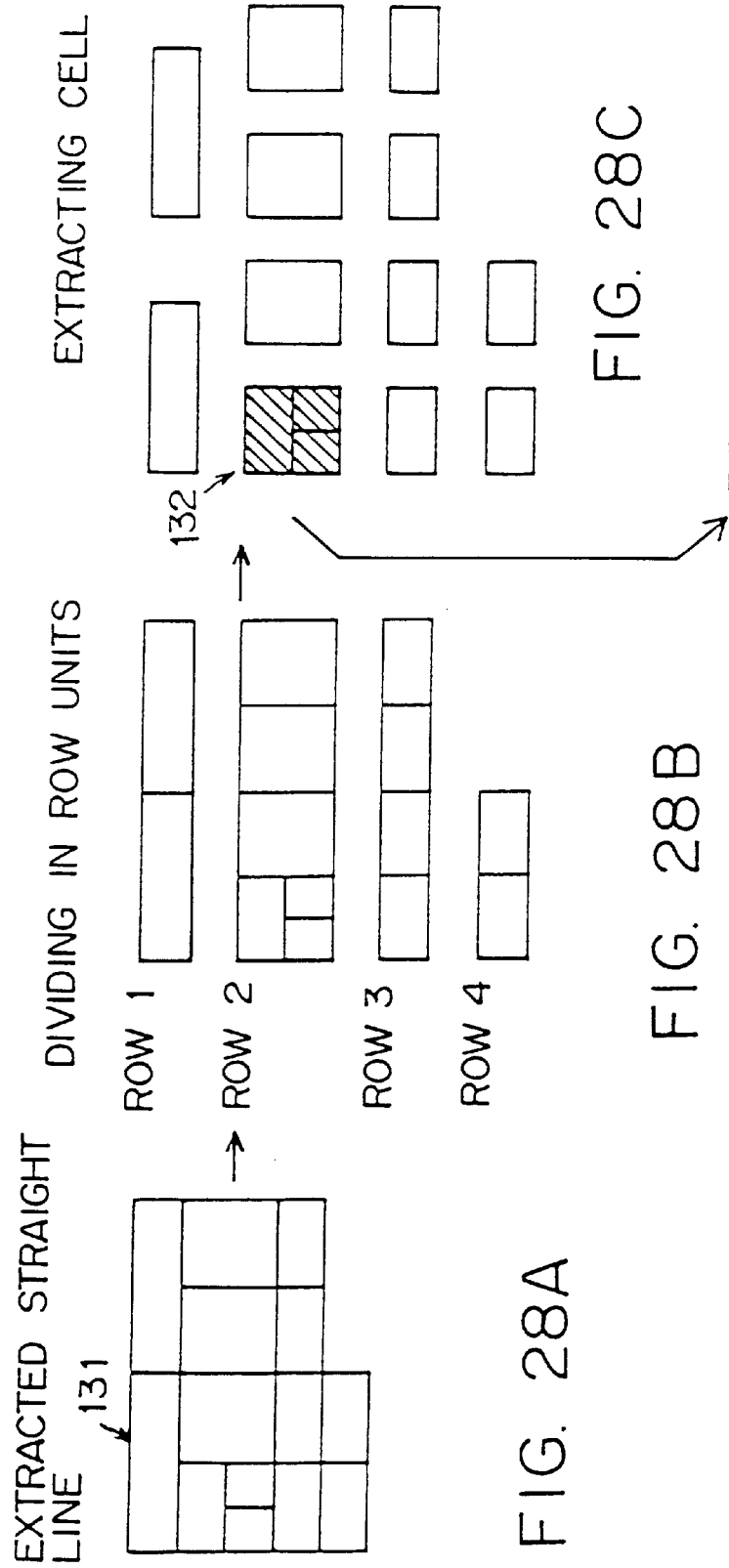
FIGS. 28A through 28D show a cell extraction process according to an embodiment of the present invention.

In FIG. 28A, a straight line forming part of a listing 131 is distinguished by extracting a candidate for a ruled line from input image data.

Next, as shown in FIG. 28B, the listing 131 is divided in row units by distinguishing a horizontal ruled line from a straight line forming part of the listing 131.

As shown in FIG. 28C, a cell is extracted from the listing 131 by distinguishing a vertical ruled line from a straight line forming part of the listing 131. At this time, it is checked whether or not a nested structure 132 can be detected in the cell extracted from the listing 131.

As shown in FIG. 28D, the nested structure 132 is regarded as a new listing, and a cell is extracted from the nested structure 132.

Thus, when a cell is extracted from the listing 131, a straight line forming part of the listing 131 is divided in cell units and the convexity/concavity of each of the divided lines can be computed. By computing the convexity/concavity of each of the divided lines, only a character portion can be retrieved from a part of a pattern regarded as a ruled line, thereby extracting only a ruled line with high precision from the listing 131 having a complicated structure.

Figure 29:
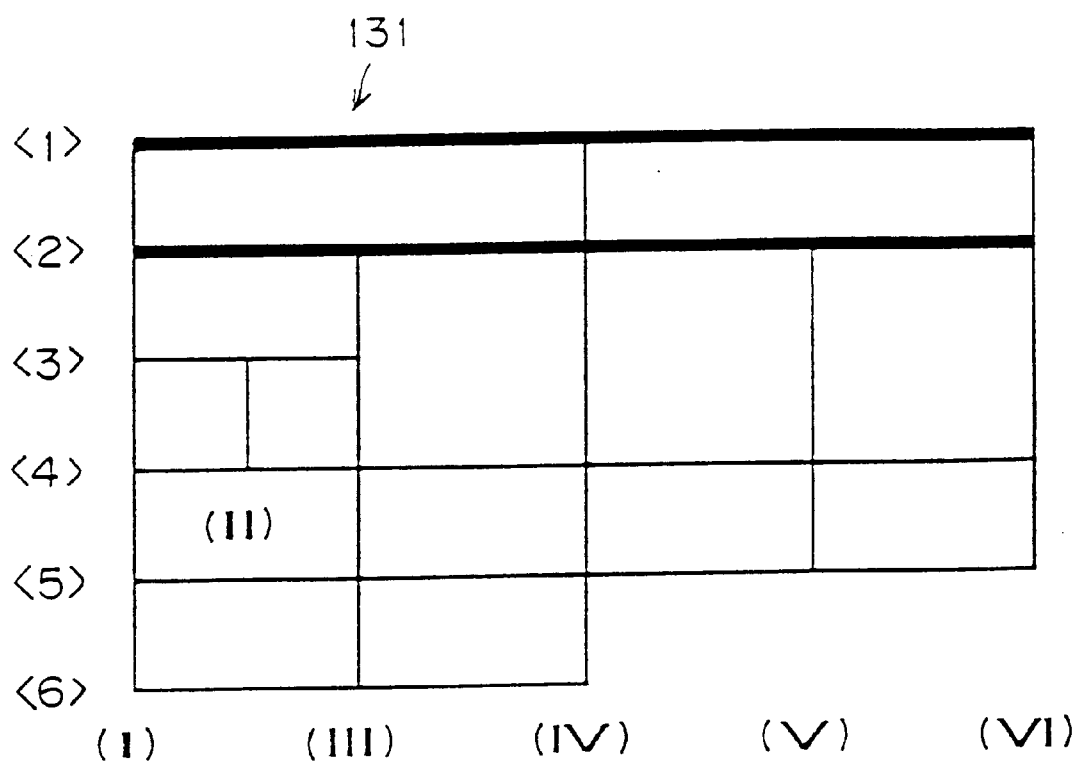
FIG. 29 shows a method of determining a horizontal ruled line according to an embodiment of the present invention.

FIG. 29 shows the method of determining a horizontal ruled line according to an embodiment of the present invention.

In FIG. 29, horizontal straight lines 1 through 6 and vertical straight lines (I) through (VI) are extracted from the listing 131, and horizontal ruled lines are distinguished by setting a pair of horizontal straight lines <1> through <6> sequentially from the top. For example, horizontal straight lines <1> and <2> are recognized as a pair of horizontal lines, and recognized as horizontal ruled lines.

The method of determining the horizontal ruled lines is followed in the procedure below.

1) Two horizontal straight lines are extracted sequentially from the top of the horizontal straight line recognized as candidates for ruled lines by the ruled line distinction process unit 25, and the two horizontal straight lines are recognized as candidate for a pair of horizontal straight lines.
2) If the lengths of the candidates for the pair of horizontal straight lines match or the lower straight line is longer than the upper straight line, then the two lines are defined as a pair of horizontal straight lines. If the lengths of the two horizontal straight lines are different from each other, the longer horizontal straight line can be checked again.
3) If the lower horizontal straight line of the two horizontal lines recognized as candidates for a pair of horizontal lines is shorter, then a horizontal straight line below the shorter line is recognized as a candidate for a horizontal ruled line, and the lengths of these two horizontal lines are compared with each other. If the lower horizontal straight line is shorter at the right or left end, then a horizontal straight line below the lower horizontal straight line is recognized as a candidate for the pair to the lower horizontal straight line, and the lengths of the horizontal straight lines are compared with each other.
4) Only if no more horizontal straight lines which satisfy the condition described in 2) exist as a result of the comparison of the horizontal straight lines, the upper and lower horizontal straight lines are defined as a pair.
5) If an unchecked horizontal straight line exists above after checking the lowest horizontal straight line, then the unchecked horizontal straight line and the checked horizontal straight lines are processed again in the processes 1) through 4) above sequentially from the top above to define a pair of horizontal straight lines.

Figure 30:
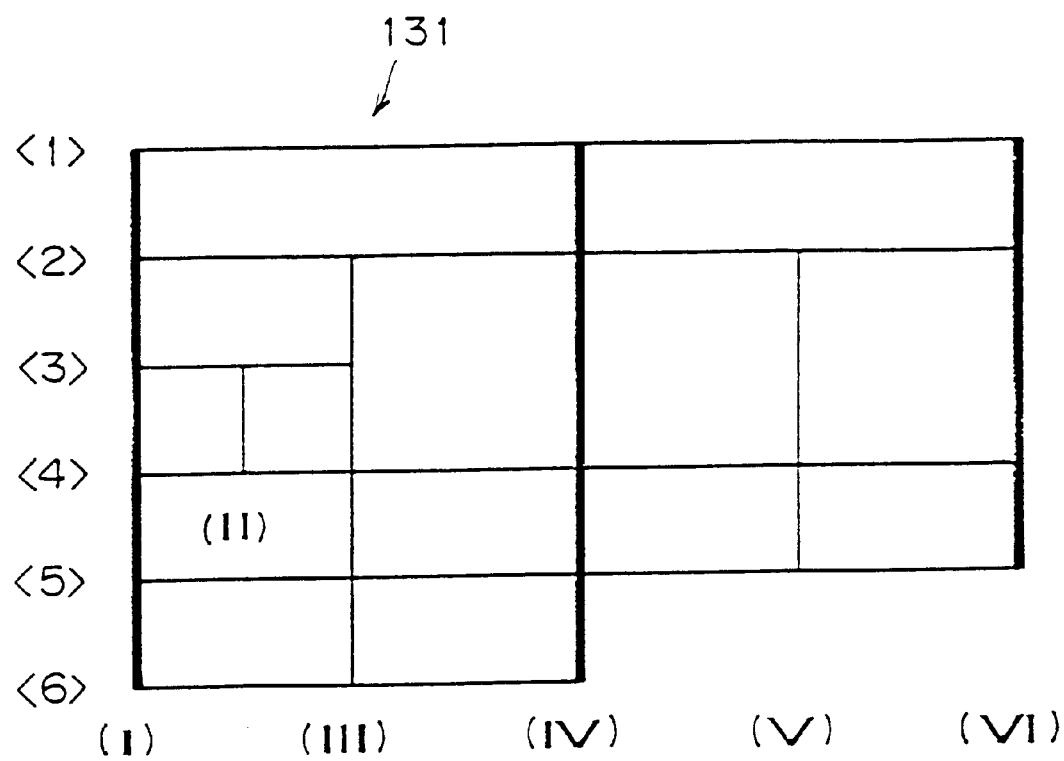
FIG. 30 shows a method of determining a vertical ruled line according to an embodiment of the present invention.

FIG. 30 shows the vertical ruled line determining method according to an embodiment of the present invention.

In FIG. 30, horizontal straight lines <1> through <6> and vertical straight lines (I) through (VI) are extracted from the listing 131, and the vertical straight lines (I) through (VI) reaching a pair of horizontal ruled lines are defined as vertical ruled lines. For example, since the upper and lower ends of the vertical straight lines (I) and (VI) reach the horizontal straight lines <1> and <2> defined as horizontal ruled lines, these vertical straight lines (I) and (VI) are defined as vertical ruled lines.

Figure 31:
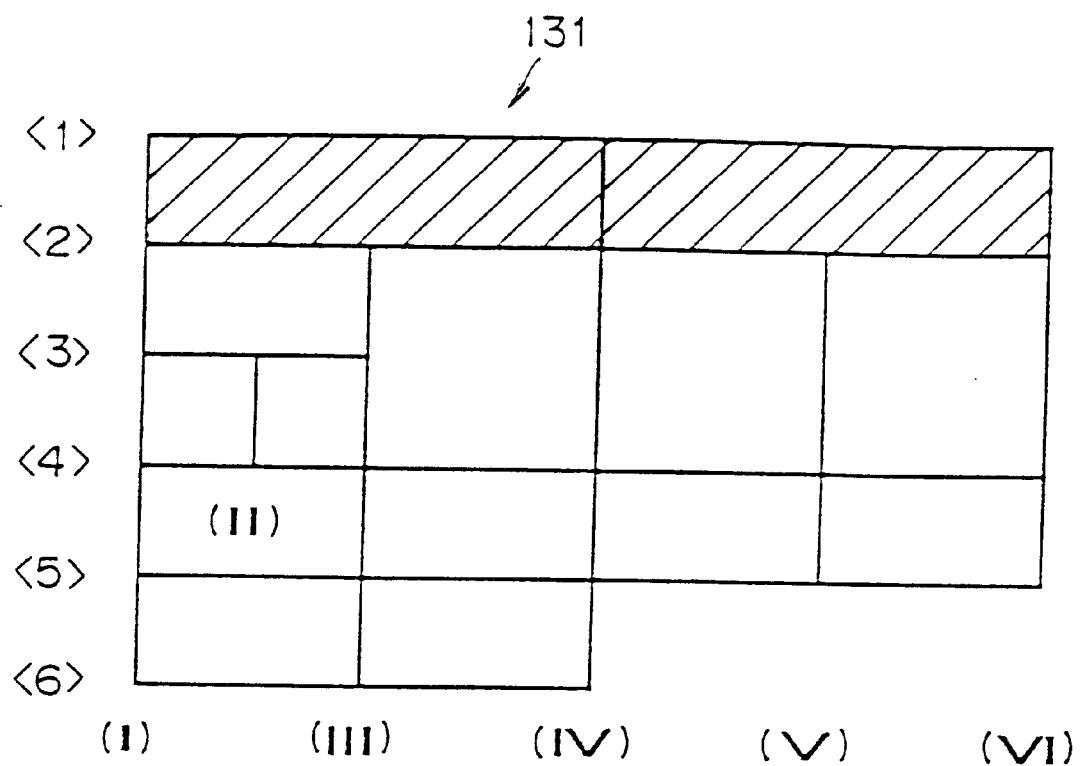
FIG. 31 shows a method of extracting a cell according to an embodiment of the present invention.

FIG. 31 shows the cell extracting method according to an embodiment of the present invention.

In FIG. 31, horizontal straight lines <1> through <6> and vertical straight lines (I) through (VI) are extracted from the listing 131, and a rectangular area encompassed by horizontal and vertical ruled lines is extracted as a cell. For example, a rectangular area encompassed by the horizontal straight line <1>, the vertical straight line (IV), the horizontal straight line <2>, and the vertical straight line (I) is extracted as a cell, and a rectangular area encompassed by the horizontal straight line <1>, the vertical straight line (VI), the horizontal straight line <2>, and the vertical straight line (IV) is extracted as a cell.

Figure 32:
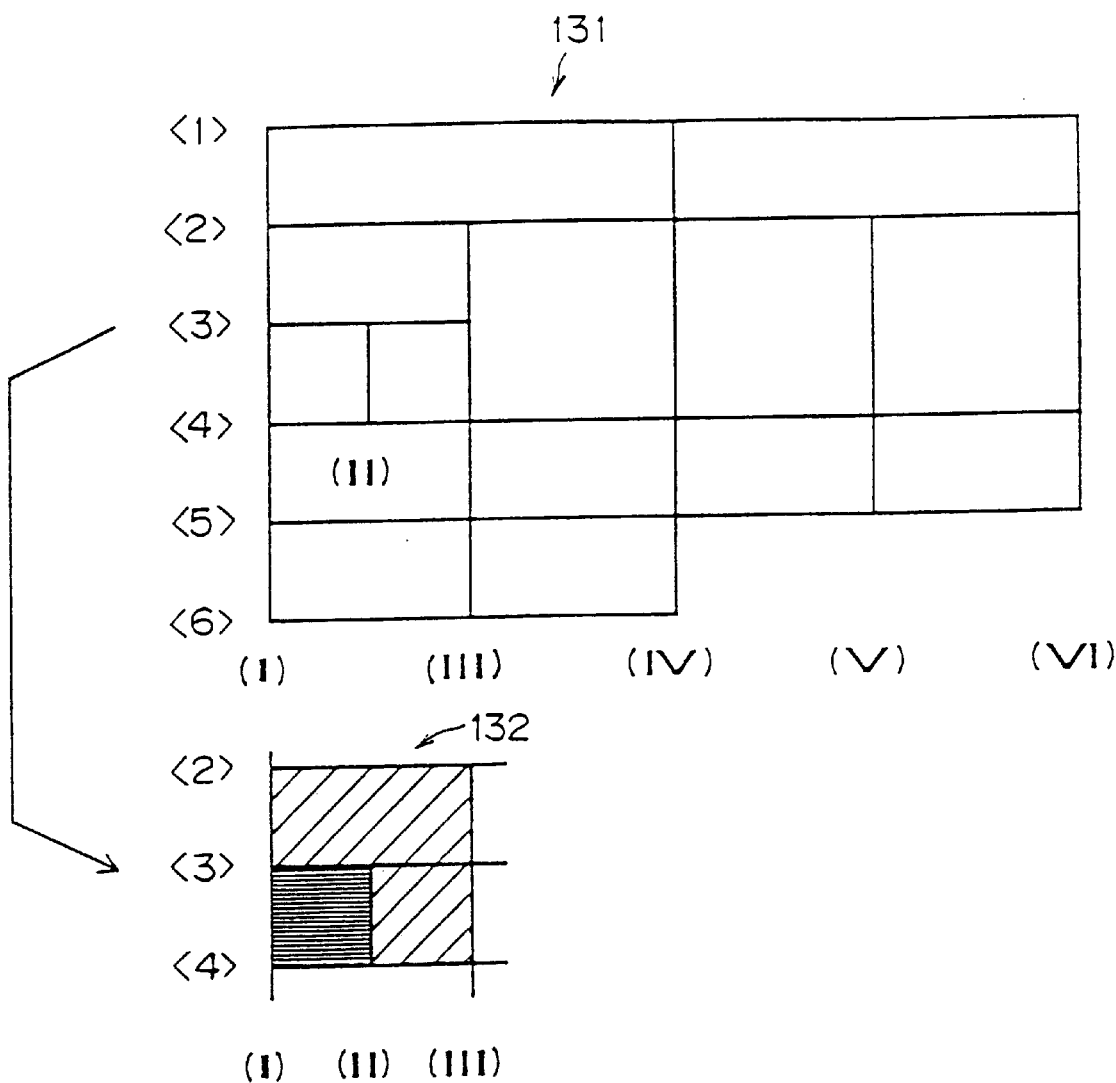
FIG. 32 shows a method of extracting a nested structure according to an embodiment of the present invention.

FIG. 32 shows the method of extracting a nested structure according to an embodiment of the present invention.

In FIG. 32, if a rectangular area encompassed by the horizontal straight line <2>, the vertical straight line (III), the horizontal straight line <4>, and the vertical straight line (I) is extracted as a cell, the cell has the nested structure 132. Therefore, horizontal ruled lines and vertical ruled lines are determined from the straight lines forming the nested structure 132, and a rectangular area encompassed by horizontal ruled lines and vertical ruled lines in the nested structure 132 is extracted as a cell. For example, a rectangular area encompassed by the horizontal straight line <2>, the vertical straight line (III), the horizontal straight line <3>, and the vertical straight line (I); a rectangular area encompassed by the horizontal straight line <3>, the vertical straight line (II), the horizontal straight line <4>, and the vertical straight line (I); and a rectangular area encompassed by the horizontal straight line <3>, the vertical straight line (III), the horizontal straight line <4>, and the vertical straight line (II) are extracted as cells. FIG. 33 is a flowchart showing the horizontal ruled line determining process according to an embodiment of the present invention.

In step S71 shown in FIG. 33, the top two horizontal straight lines are retrieved from the horizontal straight lines distinguished by the ruled line distinction process unit 25 as candidates for ruled lines.

Then, in step S72, the upper horizontal straight line of the retrieved horizontal straight lines is referred to as upline, and the lower horizontal straight line is referred to as blline.

In step S73, it is distinguished whether or not a straight line upline overlaps a straight line blline in the vertical direction. If the straight line upline does not overlap the straight line blline in the vertical direction, then control is passed to step S74, the straight line below the straight line blline is defined as a new straight line blline. This process continues until the straight line upline overlaps the straight line blline in the vertical direction.

When the straight line upline overlaps the straight line blline in the vertical direction in step S73, control is passed to step S75, and it is distinguished whether or not the lengths of the straight line upline and the straight line blline match each other or the straight line upline is shorter than the straight line blline. If a straight line upline and a straight line blline satisfying either of these conditions exist, then control is passed to step S78, and the straight line upline and the straight line blline are defined as a pair of horizontal straight lines (a pair of horizontal ruled lines).

If, in step S75, the straight line upline and the straight line blline are different in length and the straight line blline is shorter than the straight line upline, then control is passed to step S76 and it is distinguished whether or not there is a straight line blline 2 equal to or longer than the straight line upline below the straight line blline. If there are the straight line blline and the straight line upline satisfying any of the above described conditions, then control is passed to step S77, the straight line blline is updated to the straight line blline 2, and control is passed to step S78.

FIGS. 34A, 34B, 34C, 34D, and 34E show the arrangement of the horizontal straight lines according to an embodiment of the present invention.

Figure 34A:
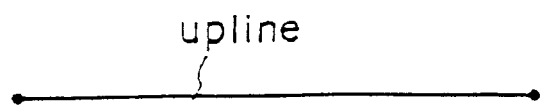
FIGS. 34A through 34E show the state of arranging horizontal straight lines according to an embodiment of the present invention.
Figure 34B:
Figure 34C:
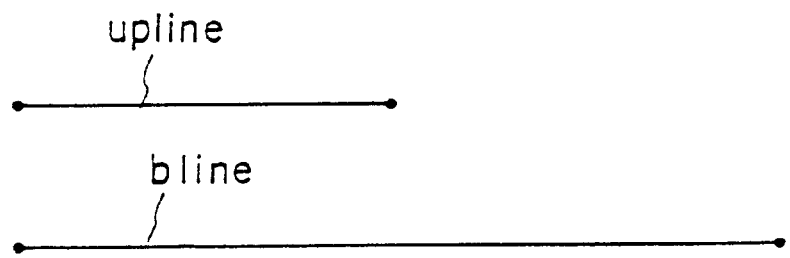

FIG. 34A shows the state in which the straight line upline is equal in length to the straight line blline. FIG. 34B shows the state in which the straight line blline is shorter than the straight line upline. FIG. 34C shows the state in which the straight line blline is longer than the straight line upline.

In step S76, if there is no straight line blline 2 equal to or longer than the straight line upline in length below the straight line blline, then control is passed to step S78, and the straight line upline and the straight line blline are defined as a pair of horizontal ruled lines.

Figure 35:
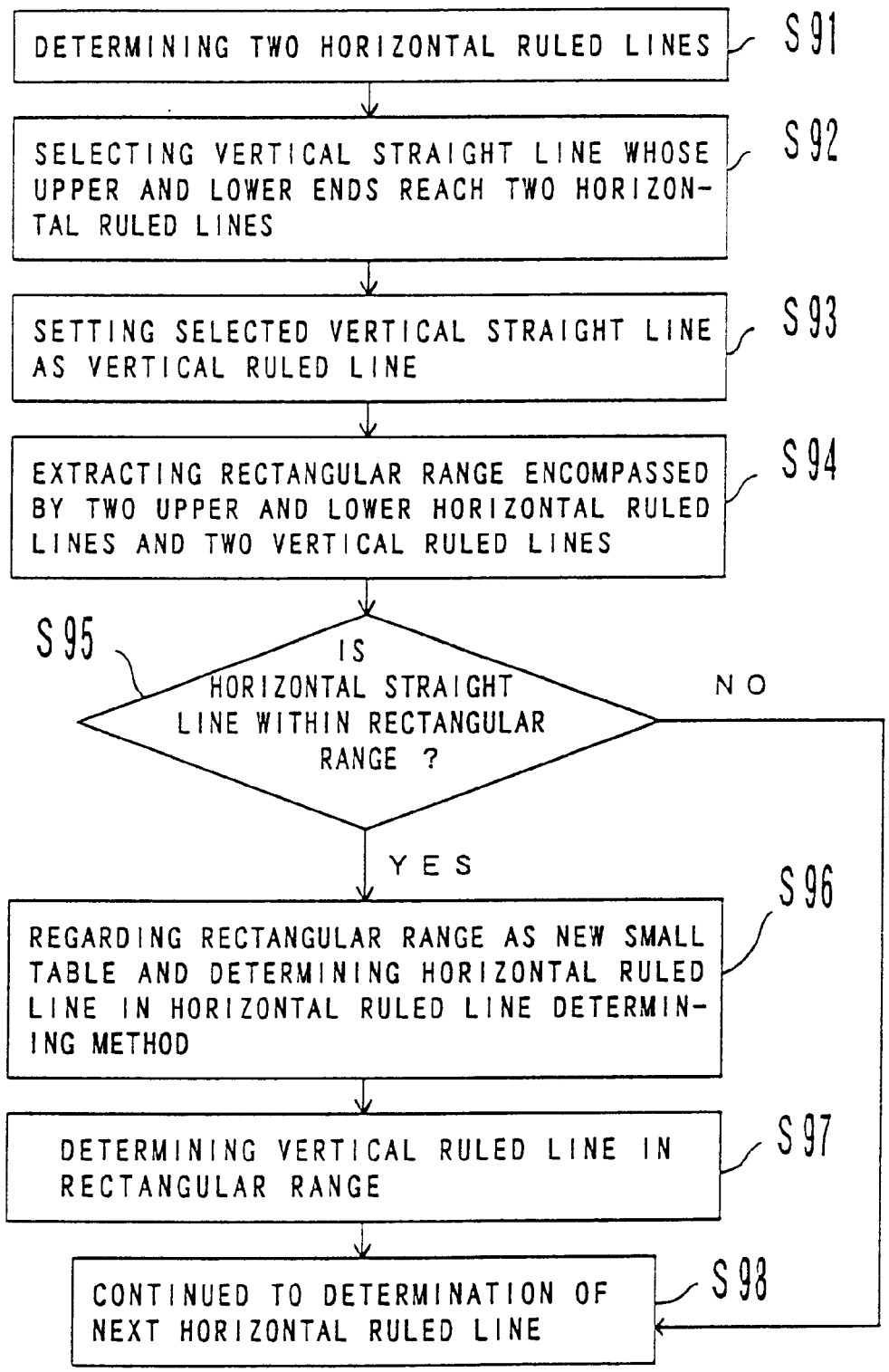
FIG. 35 is a flowchart showing a vertical ruled line determination process and a nesting process according to an embodiment of the present invention.

Then, in step S79, the vertical ruled line distinguishing process and the nesting process shown in the flowchart shown in FIG. 35 are performed.

In step S80, it is distinguished whether or not the lengths of the straight line upline and the straight line blline defined in step S78 as a pair of horizontal ruled lines are different from each other. If the straight line upline is different in length from the straight line blline, then control is passed to step S81, a longer straight line in the right or left direction can be checked again, and control is passed to step S82.

Figure 34D:
Figure 34E:
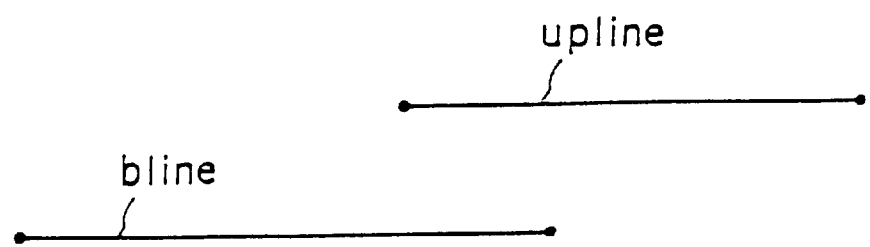

A longer straight line in the right direction refers to the straight line blline shown in FIG. 34D while a longer straight line in the left direction refers to the straight line blline shown in FIG. 34E.

If it is distinguished in step S80 that the straight line upline is equal to the straight line blline in length, then control is passed to step S82, and it is further distinguished whether or not any straight line exists below the straight line blline. If there is a straight line below the straight line blline, then control is passed to step S83, the straight line blline and the straight line below are extracted, and control is returned to step S72.

If it is distinguished in step S82 that no straight lines exist below the straight line blline, then control is passed to step S84, and all processed straight lines except straight lines which can be rechecked are removed from the straight lines to be processed.

In step S85, it is distinguished whether or not there are unprocessed straight lines. If there are no unprocessed straight lines, the process terminates.

If it is distinguished in step S85 that unprocessed straight lines exist, then control is passed to step S86, two straight lines are retrieved from the top of the straight lines, and control is returned to step S72.

FIG. 35 is a flowchart showing the vertical ruled line distinguishing process and the nesting process according to an embodiment of the present invention.

In step S91 shown in FIG. 35, a pair of horizontal ruled lines on the top of the lines are selected. In step S92, vertical straight lines reaching the upper and lower ends of a pair of horizontal ruled lines are selected from among the vertical straight lines recognized as candidates for ruled lines by the ruled line distinction process unit 25.

In step S93, the selected vertical straight line and vertical ruled line are determined.

In step S94, a rectangular area encompassed by a pair of horizontal ruled lines and two vertical ruled lines are extracted. Next, in step S95, it is distinguished whether or not there are horizontal straight lines whose both ends reach the left and right vertical ruled lines of the rectangular area. If such horizontal straight lines do not exist, the subsequent horizontal ruled line is selected and the processes similar to those in steps S92 through S97 are performed on a pair of newly selected horizontal ruled lines.

In step S95, when it is distinguished that the horizontal straight lines whose both ends reach the left and right vertical ruled lines exist, then control is passed to step S96, the rectangular area is regarded as a new small table (rectangle having a nested structure), and a horizontal ruled line forming part of a small rectangular area in the rectangular area having the nested structure is determined.

Then, in step S97, the vertical ruled lines in the rectangular area having the nested structure are determined.

FIG. 36 shows examples of a regular listing and an irregular listing according to an embodiment of the present invention.

Figure 36A:
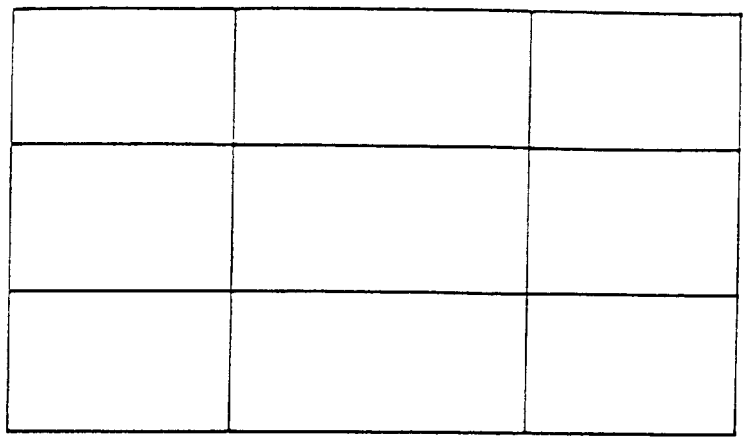
FIGS. 36A, 36B, and 36C show examples of regular and irregular listings according to an embodiment of the present invention.
Figure 36B:
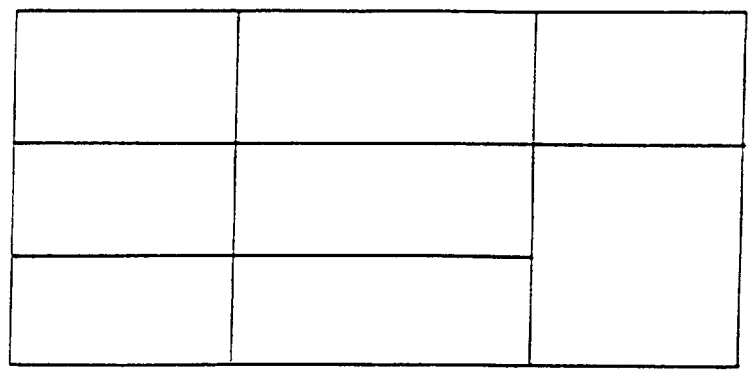
Figure 36C:
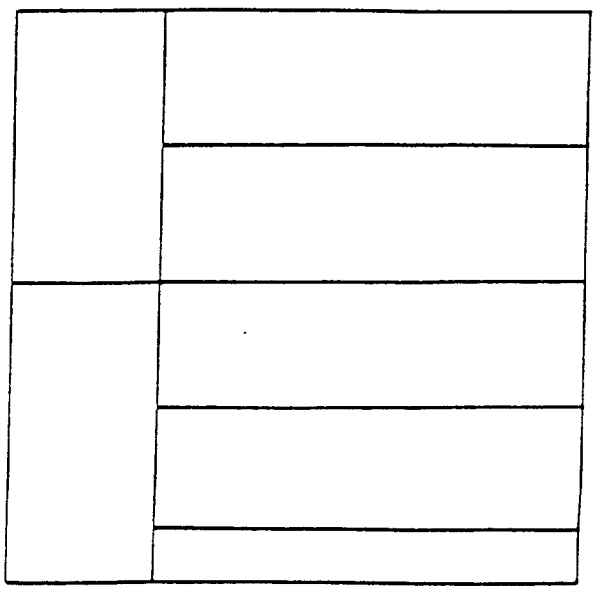

FIG. 36A shows an example of a regular listing. FIGS. 36B and 36C show examples of irregular listings. The regular listing has horizontal straight lines forming the horizontal ruled lines having the same length, and has vertical straight lines forming the vertical ruled lines having the same length. The irregular listing has horizontal straight lines forming the horizontal ruled lines of different lengths or vertical straight lines forming the vertical ruled lines of different lengths.

Figure 37A:
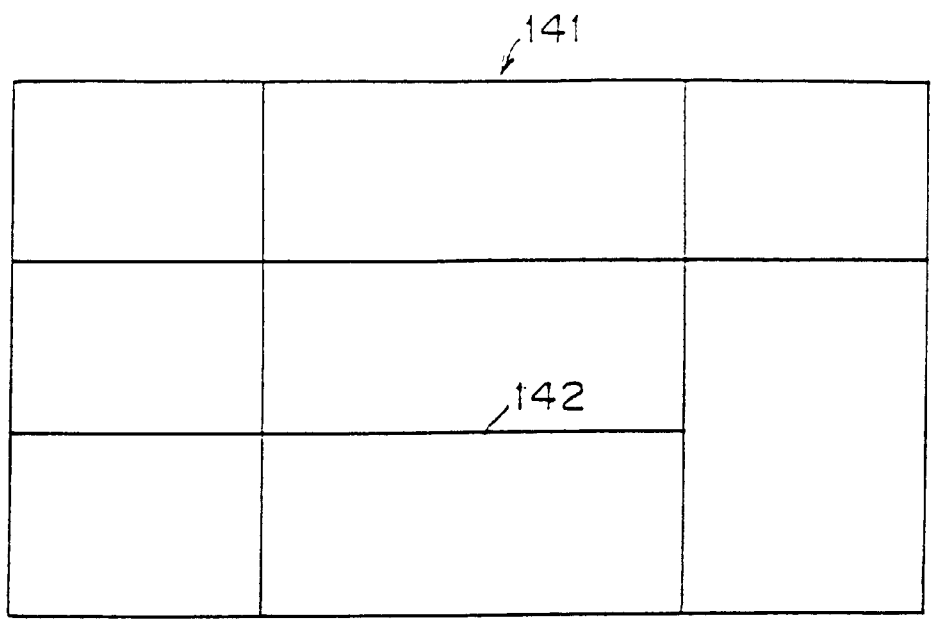
FIGS. 37A through 37B show a method of dividing an area of a candidate for a ruled line according to an embodiment of the present invention.
Figure 37B:
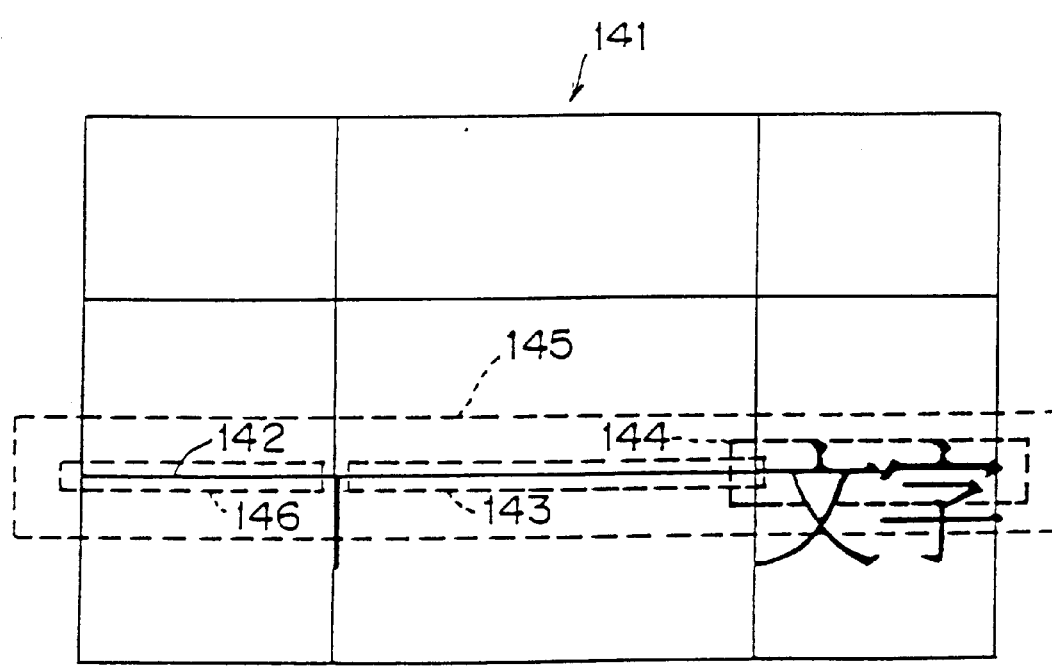

FIGS. 37A and 37B show the method of dividing an area of a candidate for a ruled line according to an embodiment of the present invention.

In FIG. 37A, a listing 141 has an irregular structure, and a horizontal straight line 142 is shorter than other horizontal straight lines. When the character string 文字 is entered beside the horizontal straight line 142 in the listing 141 as shown in FIG. 37B, the horizontal straight line 142 and a part of the character string 文字 are extracted as a ruled line candidate 145. If the convexity/concavity of the ruled line candidate 145 is computed, the part of the character string 文字 is assumed to have large convexity/concavity. However, the horizontal straight line 142 is regarded as having small convexity/concavity. The convexity/concavity of the entire ruled line candidate 145 is regarded as smaller because the convexity/concavity of the horizontal straight line 142 is reflected more.

As a result, a part of the character string 文字 is regarded as a part of the ruled line candidate 145, and the ruled line candidate 145 is regarded as forming a horizontal ruled line in the listing 141, that is, as a ruled line. Therefore, the character string 文字 cannot be correctly segmented from the listing 141, thereby lowering the reliability in character recognition.

By dividing the ruled line candidate 145 into the smallest cells, ruled line candidates 143, 144, and 146 are generated, and the convexity/concavity of the ruled line candidates 143, 144, and 146 is independently computed. As a result, the convexity/concavity of the ruled line candidates 143 and 146 is recognized as small, and the ruled line candidates 143 and 146 can be correctly recognized as ruled lines. The convexity/concavity or the ruled line candidate 144 is recognized as large, and can be correctly recognized as a non-ruled-line.

Thus, the ruled line candidate 145 is divided into the smallest cells, and the convexity/concavity can be computed for each of the ruled line candidates 143, 144, and 146. Therefore, even if a part of the character entered in an irregular listing is mistakenly extracted as a part of the ruled line candidate 145, only the part of the horizontal straight line 142 forming part of ruled lines can be extracted with high precision.

FIG. 38 shows the method of partially obtaining the convexity/concavity of a candidate for a ruled line according to an embodiment of the present invention.

Figure 38A:
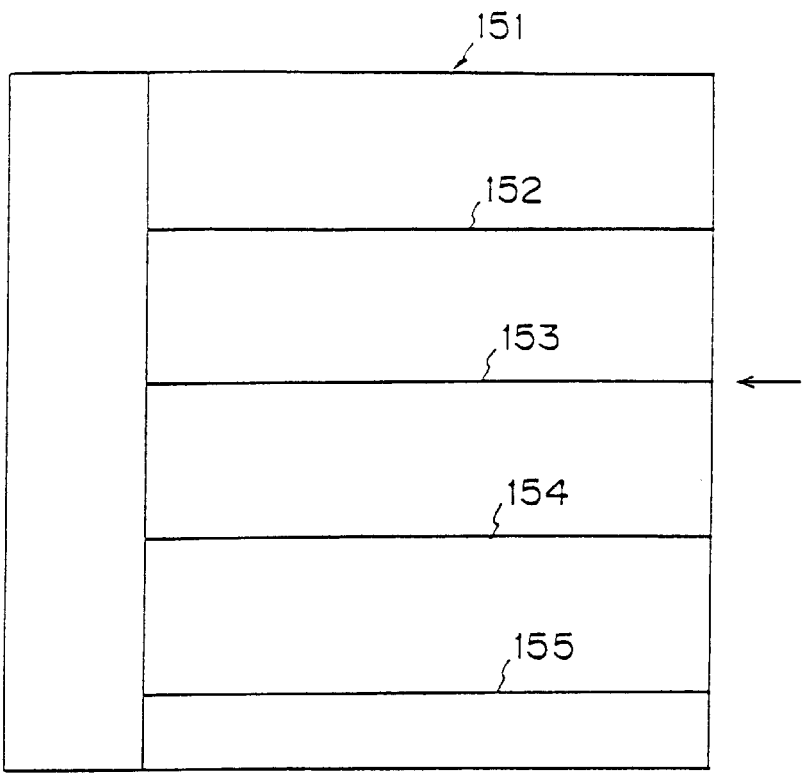
FIGS. 38A and 38B show a method of partially obtaining the convexity/concavity of an area of a candidate for a ruled line according to an embodiment of the present invention.

In FIG. 38A, a listing 151 has an irregular structure, and horizontal straight lines 152 through 155 are shorter than horizontal straight lines forming part of a rectangular box.

Figure 38B:
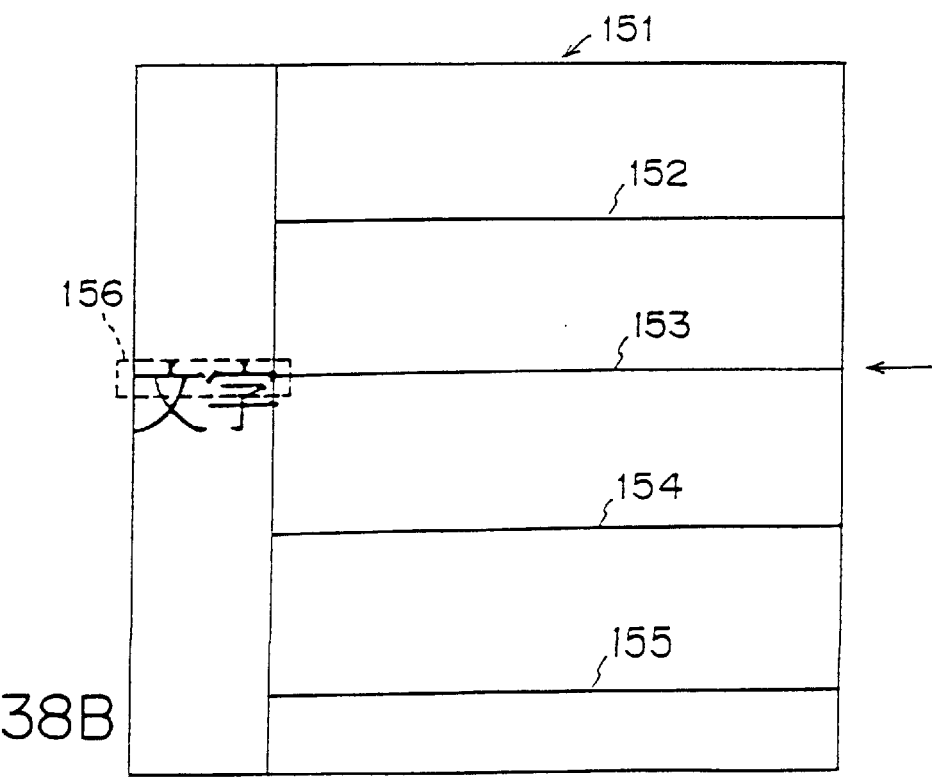

When the character string 文字 is entered beside the horizontal straight line 153 in the listing 151 as shown in FIG. 38B, the horizontal straight line 153 and a part 156 of the character string 文字 co-exist and are extracted as candidates for ruled lines. If the convexity/concavity of the ruled line candidates is computed, the part 156 of the character string 文字 is assumed to have large convexity/concavity. However, the horizontal straight line 153 is regarded as having small convexity/concavity. The convexity/concavity of the entire ruled line candidate in which the horizontal straight line 153 and the part 156 of the character string 文字 is regarded as smaller because the convexity/concavity of the horizontal straight line 153 is reflected more.

As a result, the part 156 of the character string 文字 is regarded as a part of the ruled line candidate. Therefore, the character string cannot be correctly segmented from the listing 151, thereby lowering the reliability in character recognition.

The length of the candidate for a ruled line containing the horizontal straight line 153 and the part 156 of the character string 文字 is compared with the length of the candidate for a ruled line containing other horizontal straight lines 152, 154, and 155. In comparison with other horizontal straight lines 152, 154, and 155, the candidate for a ruled line containing the horizontal straight line 153 and the part 156 of the character string 文字 is divided into portions having different lengths to generate a candidate for a ruled line corresponding to the part 156 of the character string 文字.

By computing the convexity/concavity of the divided candidate for a ruled line, the convexity/concavity of only the part 156 of the character string 文字 can be computed. The convexity/concavity of the divided candidate for a ruled line is regarded as large, and the divided candidate for a ruled line can be correctly recognized as a non-ruled-line.

Figure 39A:
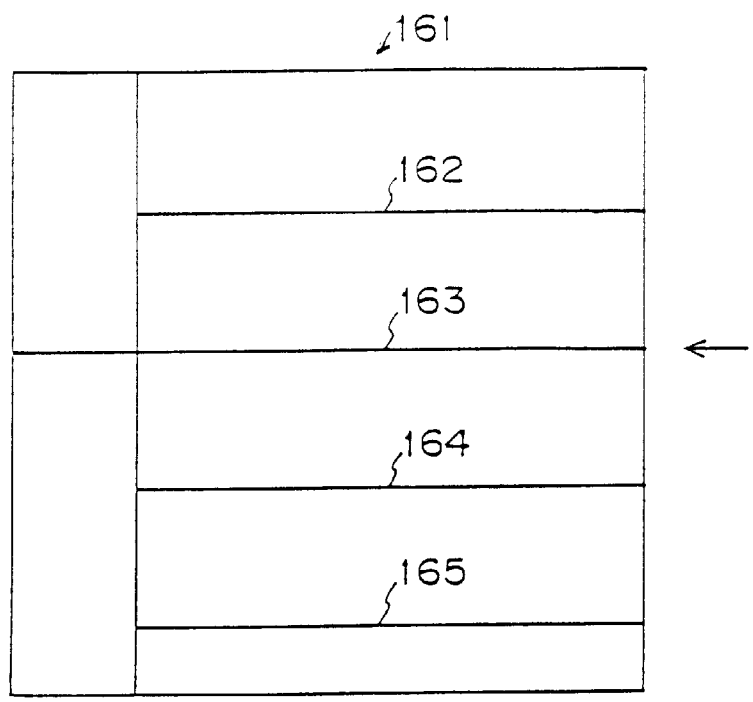
FIGS. 39A and 39B show a method of partially obtaining the convexity/concavity of an area of a candidate for a ruled line according to an embodiment of the present invention.
Figure 39B:
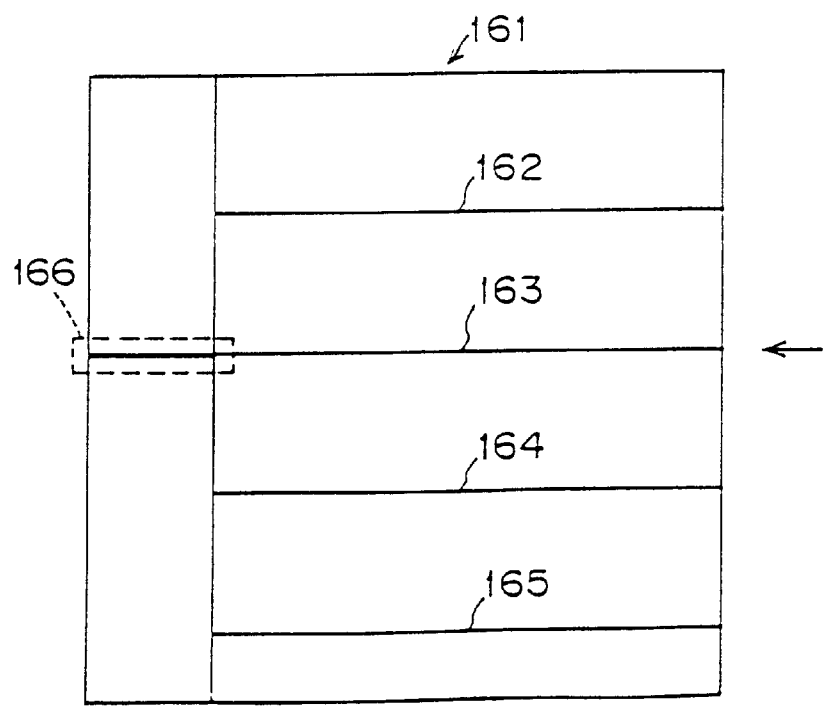

FIG. 39 shows the method of partially obtaining the convexity/concavity of the candidate for a ruled line according to an embodiment of the present invention.

In FIG. 39, a listing 161 has an irregular structure, and horizontal straight lines 162, 164, and 165 forming part of the listing 161 are shorter than a horizontal straight line 163. If the horizontal straight lines 162 through 165 are extracted from the listing 161, and the horizontal straight line 163 is longer than the horizontal straight lines 162, 164, and 165, then the convexity/concavity of a projecting portion 166 in the horizontal straight line 163. When the convexity/concavity of the projecting portion 166 is small, the projecting portion 166 is recognized as a ruled line. When the convexity/concavity of the projecting portion 166 is large, it is assumed that the projecting portion 166 is not a ruled line and the projecting portion 166 is removed from candidates for a ruled line.

The embodiments of the present invention are described above, but the present invention is not limited to the above described embodiments, and various amendments can be made within the range of the technological concept of the present invention. For example, according to the above described embodiments, the convexity/concavity of the pattern in the candidate for a ruled line is computed by searching the pattern in a candidate for a ruled line, but the convexity/concavity can also be computed in any method other than the searching method. For example, a pattern extracted as a candidate for a ruled line can be projected in a predetermined direction, and the fluctuation of the projection value of each portion of the candidate for a ruled line is computed to obtain the convexity/concavity of the pattern.

By computing the convexity/concavity of a pattern as described above, a pattern having small convexity/concavity such as a ruled line, a straight line, etc. can be distinguished from a pattern having large convexity/concavity such as a character, a symbol, etc., and the possibility that a ruled line, a straight line, etc. are mistakenly recognized as a character, a symbol, etc. can be reduced, thereby improving the pattern distinction precision.

According to an aspect of the present invention, convexity/concavity is computed based on the frequency of shifts in a pattern search direction. Thus, the convexity/concavity of a pattern can be correctly computed, and a pattern having small convexity/concavity can be correctly distinguished from a pattern having large convexity/concavity, thereby improving the precision in distinguishing a pattern.

According to another aspect of the present invention, pixels are searched in a direction different from a predetermined direction if no adjacent pixels exist in the predetermined direction. Even if a ruled line, a straight line, etc. touch another pattern such as a character, a symbol, etc., the ruled line, straight line, etc. can be correctly detected.

According to a further aspect of the present invention, the convexity/concavity can be efficiently detected while searching a pattern by counting the frequency of the search for pixels diagonally below or above.

According to a further aspect of the present invention, the convexity/concavity of a pattern can be computed by obtaining the frequency of shifts in the search direction based on the obliqueness of the pattern. Thus, the convexity/concavity of a pattern can be computed with high precision even when the pattern is oblique.

According to a further aspect of the present invention, even if a pattern is separated as a broken pattern, the convexity/concavity of the pattern can be computed by performing the search with a blank having a value equal to or below a predetermined value ignored.

According to a further aspect of the present invention, an influence of pattern size can be removed from the convexity/concavity of the pattern computed through a search by regulating the frequency of shifts in the search direction using the length of a pattern. Therefore, the convexity/concavity can be computed based on the shape of the pattern itself.

According to a further aspect of the present invention, the number of intersections can be considered when the convexity/concavity of the pattern is computed, thereby correctly obtaining the convexity/concavity of the pattern.

According to a further aspect of the present invention, when the convexity/concavity of a pattern is equal to or below a threshold, it is distinguished that the pattern forms part of a ruled line. As a result, the part of the character can be prevented from being mistakenly recognized as a ruled line. Therefore, a ruled line can be extracted with high precision.

According to a further aspect of the present invention, when the convexity/concavity of a pattern is equal to or above a threshold, it is distinguished that the pattern refers to a character. As a result, a ruled line can be prevented from being mistakenly recognized as a character, thereby improving the precision in character recognition.

According to a further aspect of the present invention, a ruled line can be extracted with high precision by changing a threshold of the convexity/concavity of a pattern based on the arrangement of the pattern.

According to a further aspect of the present invention, it is correctly distinguished whether a character extracted as a candidate for a ruled line is actually a character or a ruled line.

According to a further aspect of the present invention, convexity/concavity can be computed for each of the predetermined areas obtained by dividing a linked pattern. Even when a ruled line touched a character, the convexity/concavity of the ruled line and the character can be separately computed. As a result, it is avoided that a ruled line is mistakenly recognized as a character with the convexity/concavity of the ruled line affected by the convexity/concavity of the character, or a character is mistakenly recognized as a ruled line with the convexity/concavity of the character affected by the convexity/concavity of the ruled line.

According to a further aspect of the present invention, extremely oblique elements in the original image can be removed by performing a masking process, thereby easily extracting a candidate for a ruled line.

According to a further aspect of the present invention, a rectangular area encompassed by four ruled lines is extracted as a cell, and a ruled line which does not form part of a cell is removed from ruled lines. As a result, a straight line which does not form part of a ruled line can be removed from ruled lines, thereby improving the reliability in ruled line extraction.

According to a further aspect of the present invention, a candidate for a ruled line can be extracted from an original image with high precision even if an original image is oblique by extracting the candidate for a ruled line in a contiguous projection process, thereby improving the reliability in ruled line extraction.

According to a further aspect of the present invention, the convexity/concavity can be computed for each small area before integration by computing the convexity/concavity for each line forming part of a rectangle detected in a contiguous projection process. As a result, even if a ruled line touches a character, the ruled line and the character can be individually processed.

According to a further aspect of the present invention, a ruled line can be extracted with high precision by computing the convexity/concavity after integrating lines forming part of a rectangle.

According to a further aspect of the present invention, when a candidate for a ruled line projects from other candidates for ruled lines, the convexity/concavity of the projecting portion is computed. As a result it can be distinguished with high precision whether the projecting portion is a part of a ruled line or a character touching a ruled line. Therefore, even when a listing is formed by ruled lines of irregular lengths, the ruled lines can be extracted with high precision.

What is claimed is:

1. A pattern extraction apparatus comprising:

a pattern input unit to input a pattern;

a mask process unit to scan the pattern using a predetermined size of a mask and regarding all pixels in the mask as the pattern when the pattern accounts for a part of the mask equal to or above a predetermined value, and regarding that the mask contains no pattern when the pattern accounts for a part of the mask below a predetermined value;

a ruled line candidate extraction unit to extract from the pattern a ruled line candidate comprising a rectangular area, when a pixel density according to a contiguous projection becomes high;

a convexity/concavity computation unit to compute convexity/concavity of the pattern in the rectangular area; and a pattern distinction unit to distinguish that the pattern in the rectangular area forms part of a character when the convexity/concavity of the pattern is equal to or above a threshold and the pattern in the rectangular area forms part of a ruled line when the convexity/concavity of the pattern is below the threshold.

2. The apparatus according to claim 1, wherein
said convexity/concavity computation unit comprises a shift frequency calculation unit to compute the convexity/concavity based on a frequency of shifts in a pattern search direction.

3. The apparatus according to claim 2, wherein
said shift frequency calculation unit comprises:
a first search unit to search for pixels in a predetermined direction;
a second search unit to search for pixels in a direction different from the predetermined direction when there are no adjacent pixels in the predetermined direction; and
a count unit to count a number of searches for the pixels by said second search unit.

4. The apparatus according to claim 3, wherein
said second search unit searches for pixels diagonally below or above a target pixel when there are no adjacent pixels in the predetermined direction.

5. The apparatus according to claim 4, further comprising:
an obliqueness detection unit to detect obliqueness of a pattern;
a computation unit to compute a frequency of shifts in a search direction corresponding to the obliqueness of the pattern; and
an adjustment unit to adjust the number of searches counted by said count unit based on a value computed by said computation unit.

6. The apparatus according to claim 3, wherein
when a pattern is separated through a space having a value equal to or below a predetermined value, said first search unit searches for the pixels assuming that the space contains some pixels.

7. The apparatus according to claim 3, further comprising:
a regulation unit to regulate a number of searches performed by said second search unit using a length of a searched pattern.

8. The apparatus according to claim 1, wherein
said convexity/concavity computation unit comprises an intersection number count unit to compute the convexity/concavity based on a number of intersections in the pattern.

9. The apparatus according to claim 8, wherein
said intersection number count unit increases a number of intersections by 1, when a target pixel has neither adjacent pixels or no pixels diagonally below or above the target pixel in the search direction, and when the target pixel has some adjacent pixels in a perpendicular direction to the search direction.

10. The apparatus according to claim 1, wherein
said pattern distinction unit comprises a ruled line distinction unit to distinguish that the pattern forms part of a ruled line when the convexity/concavity of the pattern is equal to or below a threshold.

11. The apparatus according to claim 10, wherein
said pattern distinction unit changes the threshold when a pattern exists within a predetermined range from a target pattern.

12. The apparatus according to claim 11, wherein
said pattern distinction unit sets a threshold when a pattern exists within the predetermined range from the target pattern such that the threshold is below a threshold set when no pattern exists within the predetermined range from the target pattern.

13. The apparatus according to claim 1, wherein
said pattern distinction unit comprises a character distinction unit to distinguish that the pattern forms part of a character when the convexity/concavity of the pattern is equal to or above a threshold.

14. A pattern extraction apparatus comprising:
a linked pattern extraction unit to extract a partial pattern formed by linked pixels from input original image data;
a mask process unit to scan the partial pattern using a predetermined size of a mask and regarding all pixels in the mask as the partial pattern when the partial pattern accounts for a part of the mask equal to or above a predetermined value, and regarding that the mask contains no partial pattern when the partial pattern accounts for a part of the mask below a predetermined value;
a ruled line candidate extraction unit to extract as a candidate for a ruled line a rectangular area having a high density of pixels from the partial pattern according to a contiguous projection;
a search unit to search the partial pattern in the rectangular area;
a convexity/concavity computation unit to compute convexity/concavity of the partial pattern based on a search result; and
a ruled line distinction unit to distinguish that the partial pattern forms part of a character when the convexity/concavity of the partial pattern is equal to or above a threshold and the partial pattern forms part of a ruled line when the convexity/concavity of the partial pattern is below the threshold.

15. The apparatus according to claim 14, wherein
said convexity/concavity computation unit computes the convexity/concavity of the partial pattern of each area which is divided into a predetermined number of areas.

16. The apparatus according to claim 14, further comprising:
a mask process unit to scan the partial pattern using a predetermined size of a mask and regarding all pixels in the mask as the partial pattern when the partial pattern accounts for a part of the mask equal to or above a predetermined value, and regarding that the mask contains no partial pattern when the partial pattern accounts for a part of the mask below a predetermined value.

17. The apparatus according to claim 14, further comprising:
a cell area extraction unit to extract as a cell a rectangular area encompassed by four ruled lines; and
a ruled line removal unit to remove a ruled line not forming part of a cell from ruled lines distinguished by said ruled line distinction unit.

18. The apparatus according to claim 17, wherein
said convexity/concavity computation unit computes the convexity/concavity of the candidate for a ruled line of each rules line which is divided into the cell.

19. The apparatus according to claim 14, wherein
said ruled line candidate extraction unit comprises:
a segment detection unit to detect as a segment forming part of a rectangle a partial pattern having a sum, equal to or above a predetermined value, of a projection value of a row or a column and a projection value of a surrounding row or column; and a straight lined detection unit to integrate a plurality of lines forming part of a rectangle in a predetermined range and detecting a straight line by approximating a rectangle from the integrated lines forming part of a rectangle.

20. The apparatus according to claim 19, wherein
said convexity/concavity computation unit computes the convexity/concavity for each of the lines forming part of a rectangle integrated by said straight line detection unit.

21. The apparatus according to claim 14, further comprising:
a length computation unit to compute a length of a candidate for a ruled line;
a length comparison unit to compare the length of the candidate for a ruled line with a length of a surrounding candidate for a ruled line;
a convexity/concavity obtaining unit to obtain the convexity/concavity of a portion where the length of the candidate for a ruled line is different from the length of the surrounding candidate for a ruled line; and
a ruled line exclusion unit to exclude the portion where the lengths of the candidates are different from the candidates when the convexity/concavity of the portion is equal to or above a predetermined value.

22. The apparatus according to claim 14, further comprising:
a listing distinction unit to distinguish whether a listing containing the ruled line is regular or irregular; and
a partial convexity/concavity computation unit to compute the convexity/concavity of a part of a ruled line which causes irregularity of an irregular listing.

23. A method of extracting a pattern, comprising:
inputting a pattern;
scanning the pattern using a predetermined size of a mask and regarding all pixels in the mask as a partial pattern when the partial pattern accounts for a part of the mask equal to or above a predetermined value, and regarding that the mask contains no partial pattern when the partial pattern accounts for a part of the mask below a predetermined value;
extracting as a candidate for a ruled line a rectangular area having a high density of pixels from the partial pattern according to a contiguous projection;
computing convexity/concavity of the partial pattern in the rectangular area; and
distinguishing that the partial pattern forms parts of a character when the convexity/concavity of the pattern is equal to or above a threshold and the partial pattern forms part of a ruled line when the convexity/concavity of the pattern is below the threshold.

24. A method of extracting a pattern, comprising:
scanning a pattern using a predetermined size of a mask and regarding all pixels in the mask as a partial pattern when the partial pattern accounts for a part of the mask equal to or above a predetermined value, and regarding that the mask contains no partial pattern when the partial pattern accounts for a part of the mask below a predetermined value;
extracting as a candidate for a ruled line a rectangular area having a high density of pixels from the partial pattern according to a contiguous projection;
searching for pixels of the partial pattern in the rectangular area in a predetermined direction;
searching for pixels diagonally below or above a target pixel when there are no adjacent pixels in the predetermined direction;
counting a number of searches for the pixels diagonally below or above the target pixel;
regarding the pattern as part of a ruled line when the number of searches for the pixels diagonally below or above the target pixel is equal to or below a predetermined value; and
regarding the pattern as a character when the number of searches for the pixels diagonally below or above the target pixel is above the predetermined value.

25. A method of extracting a pattern, comprising:
scanning a pattern using a predetermined size of a mask and regarding all pixels in the mask as a partial pattern when the partial pattern accounts for a part of the mask equal to or above a predetermined value, and regarding that the mask contains no partial pattern when the partial pattern accounts for a part of the mask below a predetermined value;
extracting as a candidate for a ruled line a rectangular area having a high density of pixels from the partial pattern according to a contiguous projection;
searching the partial pattern in the rectangular area;
computing convexity/concavity of the partial pattern based on a search result;
distinguishing that the partial pattern forms part of a ruled line when the convexity/concavity is equal to or above a predetermined value; and
distinguishing that the partial pattern forms part of a character when the convexity/concavity is below the predetermined value.

26. A computer-readable storage medium used to direct a computer to perform:
inputting a pattern;
scanning the pattern using a predetermined size of a mask and regarding all pixels in the mask as a partial pattern when the partial pattern accounts for a part of the mask equal to or above a predetermined value, and regarding that the mask contains no partial pattern when the partial pattern accounts for a part of the mask below a predetermined value;
extracting as a candidate for a ruled line a rectangular area having a high density of pixels from the partial pattern according to a contiguous projection;
computing convexity/concavity of the partial pattern in the rectangular area; and
distinguishing that the pattern forms part of a character when the convexity/concavity of the pattern is equal to or above a threshold and the pattern forms part of a ruled line when the convexity/concavity of the pattern is below the threshold.

27. A computer-readable storage medium used to direct a computer to perform:
scanning a pattern using a predetermined size of a mask and regarding all pixels in the mask as a partial pattern when the partial pattern accounts for a part of the mask equal to or above a predetermined value, and regarding that the mask contains no partial pattern when the partial pattern accounts for a part of the mask below a predetermined value;
extracting as a candidate for a ruled line a rectangular area having a high density of pixels from the partial pattern according to a contiguous projection;

searching for pixels of the partial pattern in the rectangular area in a predetermined direction;

searching for pixels diagonally below or above a target pixel when there are no adjacent pixels in the predetermined direction;

counting a number of searches for the pixels diagonally below or above the target pixel;

regarding the pattern as part of a ruled line when the number of searches for the pixels diagonally below or above the target pixel is equal to or below a predetermined value; and regarding the pattern as part of a character when the number of searches for the pixels diagonally below or above the target pixel is above the predetermined value.

28. A computer-readable storage medium used to direct a computer to perform:

scanning a pattern using a predetermined size of a mask and regarding all pixels in the mask as a partial pattern when the partial pattern accounts for a part of the mask equal to or above a predetermined value, and regarding that the mask contains no partial pattern when the partial pattern accounts for a part of the mask below a predetermined value;

extracting as a candidate for a ruled line a rectangular area having a high density of pixels from the partial pattern according to a contiguous projection;

searching the partial pattern in the rectangular area;

computing convexity/concavity of the partial pattern based on a search result;

distinguishing that the partial pattern forms part of a ruled line when the convexity/concavity is equal to or above a predetermined value; and distinguishing that the partial pattern forms part of a character when the convexity/concavity is below the predetermined value.

29. A method, comprising:

scanning a pattern using a predetermined size of a mask and regarding all pixels in the mask as a partial pattern when the partial pattern accounts for a part of the mask equal to or above a predetermined value, and regarding that the mask contains no partial pattern when the partial pattern accounts for a part of the mask below a predetermined value;

extracting a candidate pattern having a high density of pixels from the partial pattern according to a contiguous projection;

tracing the candidate pattern while counting a number of direction changes of the candidate pattern; and determining that the candidate pattern is a ruled line if the number of direction changes is below a predetermined threshold and the candidate pattern is a character if the number of direction changes is above the predetermined threshold.

* * * * *